United States Patent
Nagatomo

(10) Patent No.: US 8,068,137 B2
(45) Date of Patent: Nov. 29, 2011

(54) IMAGE PROCESSING APPARATUS, CONTROL METHOD, AND STORAGE MEDIUM

(75) Inventor: Yasutaka Nagatomo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 468 days.

(21) Appl. No.: 12/332,177

(22) Filed: Dec. 10, 2008

(65) Prior Publication Data

US 2009/0147088 A1   Jun. 11, 2009

(30) Foreign Application Priority Data

Dec. 11, 2007 (JP) ................. 2007-319992

(51) Int. Cl.
*H04N 5/225* (2006.01)
(52) U.S. Cl. .................................. 348/207.2
(58) Field of Classification Search ............ 348/207.2, 348/207.99; 382/118
See application file for complete search history.

(56) References Cited

U.S. PATENT DOCUMENTS

| 7,697,039 B2* | 4/2010 | Shiota et al. ............ 348/231.2 |
| 7,967,039 B2* | 6/2011 | McKee ...................... 141/302 |
| 2006/0206592 A1* | 9/2006 | Fujii et al. ................ 709/220 |
| 2008/0008361 A1 | 1/2008 | Nozaki et al. |
| 2009/0153692 A1* | 6/2009 | Koide ...................... 348/222.1 |

FOREIGN PATENT DOCUMENTS

| JP | 9-281605 | 10/1997 |
| JP | 10-214003 | 8/1998 |
| JP | 2003-219329 | 7/2003 |
| JP | 2006-088532 | 4/2006 |
| JP | 2007-282119 | 10/2007 |

\* cited by examiner

*Primary Examiner* — David Ometz
*Assistant Examiner* — Fayez Bhuiyan

(57) ABSTRACT

An image processing apparatus includes a setting unit configured to set a number of prints for image data, a storage unit configured to store identification information for identifying an object in association with transmission target information used for transmitting the image data to an external apparatus, and a collation unit configured to collate the identified object from the image data and the identification information. In the image processing apparatus, the setting unit can set the number of prints for the image data according to a difference between a number of the objects in the image data and a number of the transmission target information associated with a number of the identification information that matches the object in the image data as a result of the collation.

13 Claims, 22 Drawing Sheets

FIG.6

| NAME | CONNECTION CONTEXT | REGISTERED FACE DATA | TRANSMISSION TARGET FLAG |
|---|---|---|---|
| CAMERA 2 | ***** | PERSON A, PERSON B | FALSE |
| CAMERA 3 | $$$$$ | PERSON C, PERSON H | FALSE |
| CAMERA 4 | &&&&& | PERSON A, PERSON F, PERSON I | FALSE |
| CAMERA 5 | ##### | PERSON J | FALSE |
| CAMERA 6 | %%%%% | PERSON D, PERSON K | FALSE |
| PRINTER | ¥¥¥¥¥ | | |

FIG.7

COLLATION SOURCE FACE DATA LIST

| | FACE DATA | REGISTERED IN... |
|---|---|---|
| PERSON A | 😊 | CAMERA 2 |
| PERSON B | 😵 | CAMERA 2 |
| PERSON F | 😊 | CAMERA 4 |
| PERSON I | 😑 | CAMERA 4 |
| PERSON J | 😠 | CAMERA 5 |

FIG.8
COLLATION DESTINATION FACE DATA LIST
| | FACE DATA | IMAGE TRANSMISSION COMPLETION FLAG | MATCHING STATUS FLAG |
|---|---|---|---|
| PERSON A |  | FALSE | FALSE |
| PERSON B |  | FALSE | FALSE |
| PERSON C |  | FALSE | FALSE |
| PERSON D |  | FALSE | FALSE |
| PERSON E |  | FALSE | FALSE |
| PERSON F |  | FALSE | FALSE |
| PERSON G |  | FALSE | FALSE |

FIG.10

| NAME | CONNECTION CONTEXT | REGISTERED FACE DATA | TRANSMISSION TARGET FLAG |
|---|---|---|---|
| CAMERA 2 | ***** | PERSON A, PERSON B | TRUE |
| CAMERA 3 | $$$$$ | PERSON C, PERSON H | FALSE |
| CAMERA 4 | &&&&& | PERSON A, PERSON F, PERSON I | TRUE |
| CAMERA 5 | ##### | PERSON J | FALSE |
| CAMERA 6 | %%%%% | PERSON D, PERSON K | FALSE |
| PRINTER | ¥¥¥¥¥ | | |

FIG.12
COLLATION DESTINATION FACE DATA LIST
| | FACE DATA | IMAGE TRANSMISSION COMPLETION FLAG | MATCHING STATUS FLAG |
|---|---|---|---|
| PERSON A |  | TRUE | TRUE |
| PERSON B |  | TRUE | TRUE |
| PERSON C |  | FALSE | FALSE |
| PERSON D |  | FALSE | FALSE |
| PERSON E |  | FALSE | FALSE |
| PERSON F |  | TRUE | TRUE |
| PERSON G |  | FALSE | FALSE |

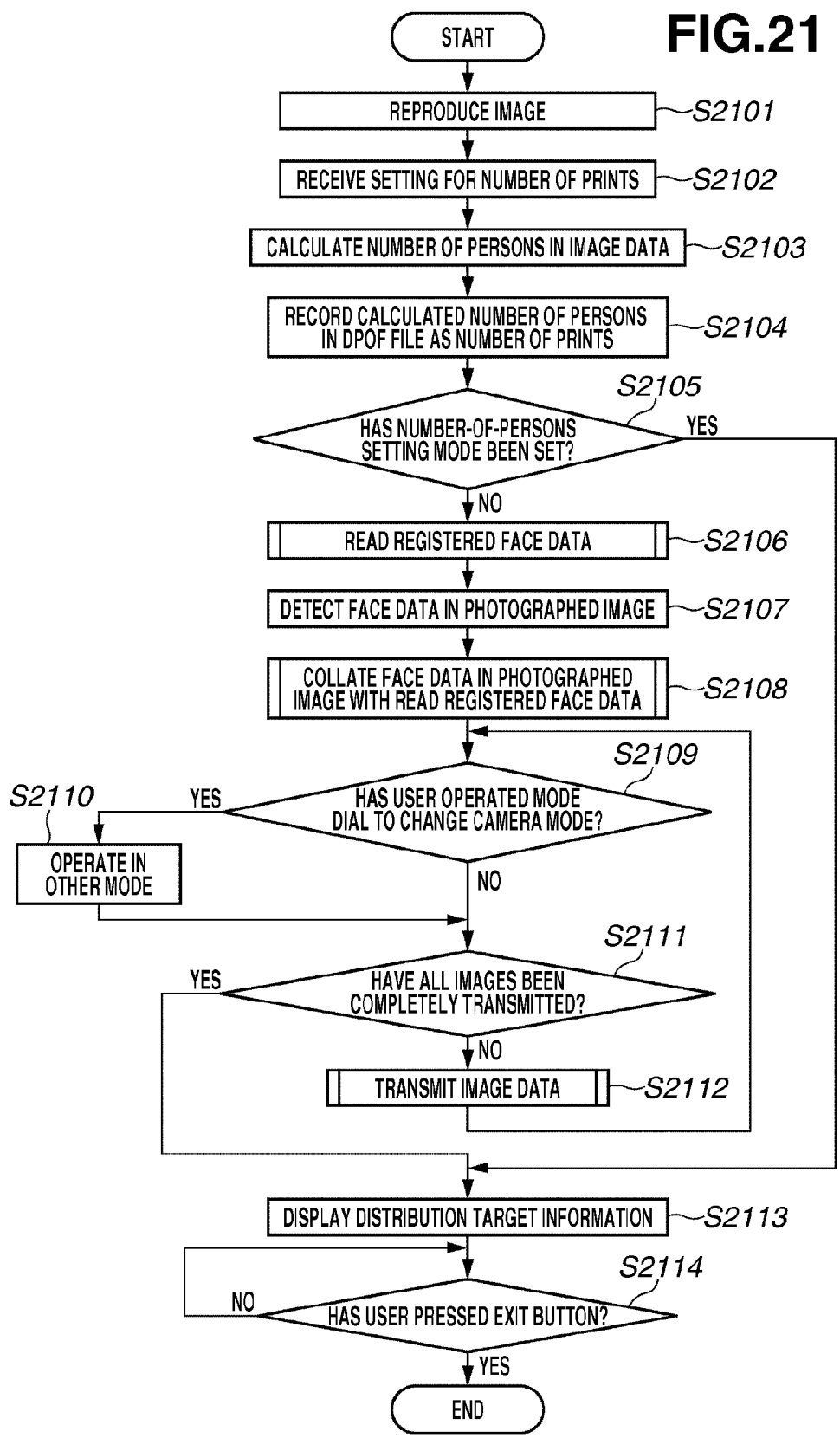

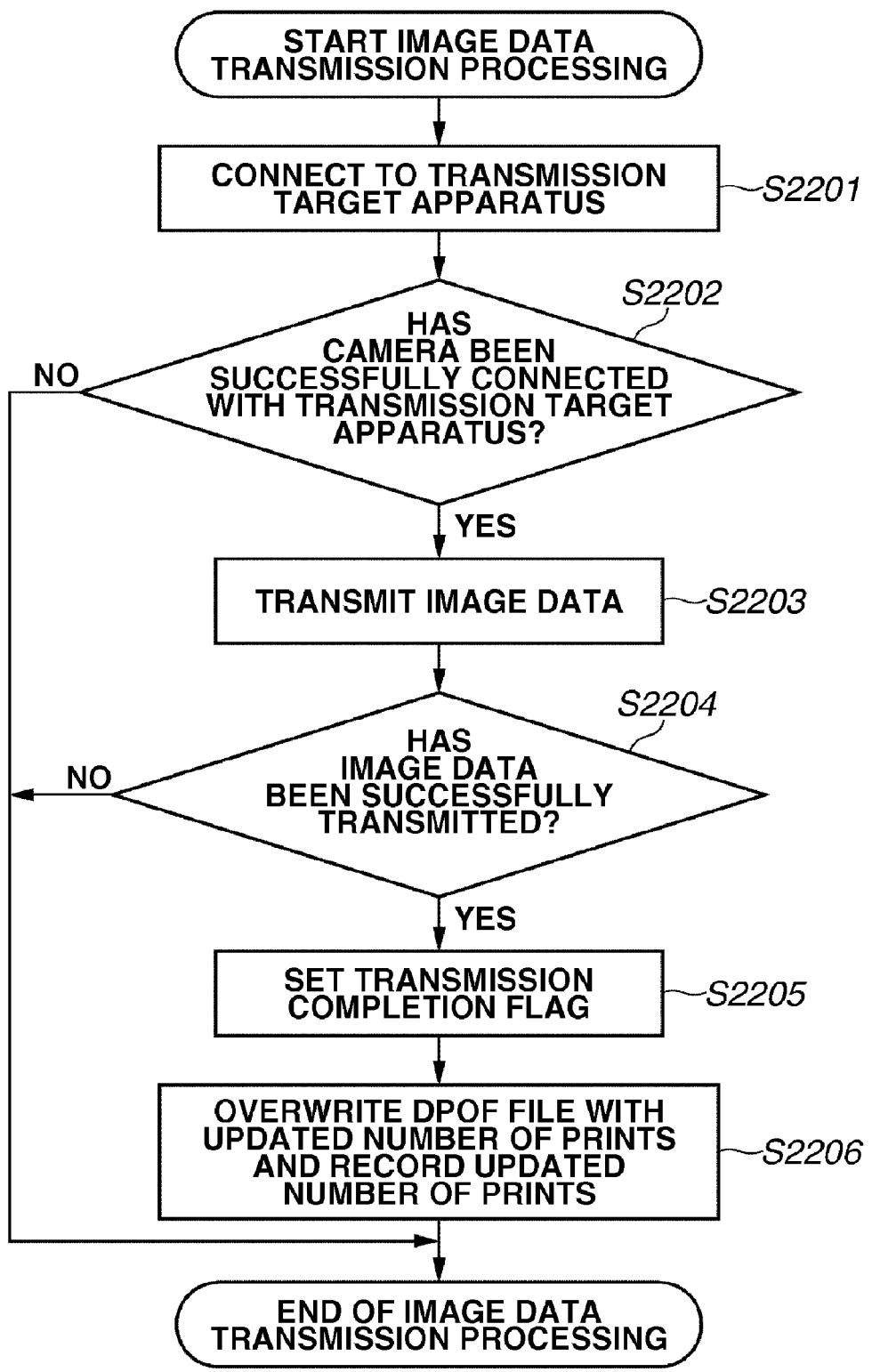

IMAGE PROCESSING APPARATUS, CONTROL METHOD, AND STORAGE MEDIUM

BACKGROUND OF THE INVENTION

1. Field of the Invention

The present invention relates to an image processing apparatus capable of appropriately and effectively transmitting image data to an external apparatus, an image processing apparatus control method, and a storage medium.

2. Description of the Related Art

Conventionally, when a user of a digital camera captures an image of a person, the user can record the captured image and print the recorded image of the person with a home printer. Furthermore, the user can previously generate a print instruction file based on a digital print order format (DPOF). The user then records the generated print instruction file on a recording medium such as a memory card. In this case, the user brings the memory card to a photo studio to print an arbitrary number of print copies of a desired image.

When distributing a print product to persons captured in the recorded image, the user sets the number of persons captured in the image as the number of prints and then prints the set number of the images. More specifically, a method for detecting the face of the person captured in the image and setting the number of the detected faces as the number of prints for the image is discussed in each of Japanese Patent Application Laid-Open No. 09-281605, Japanese Patent Application Laid-Open No. 10-214003, Japanese Patent Application Laid-Open No. 2003-219329, and Japanese Patent Application Laid-Open No. 2006-088532.

On the other hand, in recent years, a wireless communication between peripheral devices has been widely utilized. Under these circumstances, users of such a digital camera can transmit and receive image data by utilizing an image transmission system that includes a digital camera having the communication unit and performs a wireless communication with peripheral apparatuses.

When the conventional method for setting the number of prints is applied to the image transmission system, the number of persons captured in the image is set as the number of prints even if an owner of an apparatus to which image data can be transmitted by the image transmission system or a person who has close relationship with the owner is captured in the image.

However, in the case where the user owns the apparatus that can transmit image data by the image transmission system, it may be more convenient for the owner user if image data of the captured image is obtained instead of a print product thereof.

This is because if the user receives the image data of the captured image, the user can edit or print the image at home. When the conventional method for setting the number of prints is simply applied to the image transmission system without considering such circumstances, the image data may be wastefully printed in the number of prints exceeding the number actually desired and necessary.

SUMMARY OF THE INVENTION

An embodiment of the present invention is directed to an image transmission system capable of easily setting an appropriate number of prints.

According to an aspect of the present invention, an image processing apparatus includes a setting unit configured to set a number of prints for image data, a storage unit configured to store identification information for identifying an object in association with transmission target information used for transmitting the image data to an external apparatus, and a collation unit configured to collate the object identified from the image data and the identification information. In the image processing apparatus, the setting unit can set the number of prints for the image data according to a difference between a number of the objects identified from the image data and a number of the transmission target information associated with a number of the identification information that matches the object identified from the image data as a result of the collations.

According to another aspect of the present invention, an image processing apparatus includes a setting unit configured to set a number of prints for image data, a storage unit configured to store identification information for identifying an object in association with information about an external apparatus to which the image data is to be transmitted, a collation unit configured to collate the object identified from the image data and the identification information, and a transmission unit configured to transmit the image data to the external apparatus according to the information about the external apparatus that is associated with the object that matches the identification information associated with the image data transmission target information as a result of the collation. In the image processing apparatus, the setting unit sets the number of prints for the image data according to a difference between a number of the objects identified from the image data and a number of the identification information associated with the information about the external apparatus to which the image data is transmitted by the transmission unit.

According to another aspect of the present invention, a method for controlling an image processing apparatus includes storing identification information for identifying an object in association with transmission target information used for transmitting the image data to an external apparatus, collating the object identified from the image data and the identification information, and setting the number of prints for the image data according to a difference between a number of the object identified from the image data and a number of the transmission target information associated with a number of the identification information that matches the object identified from the image data as a result of the collation.

According to another aspect of the present invention, a method for controlling an image processing apparatus includes storing identification information for identifying an object in association with information about an external apparatus to which the image data is to be transmitted, collating the object identified from the image data and the identification information, transmitting the image data to the external apparatus according to the information about the external apparatus that is associated with the person that matches the identification information associated with the transmission target information as a result of the collation, and setting the number of prints for the image data according to a difference between a number of the objects identified from the image data and a number of the identification information associated with the information about the external apparatus to which the image data is transmitted.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 6 illustrates an example of a registered apparatus table according to the exemplary embodiment of the present invention.

FIG. 7 illustrates an example of a collation source face data list according to the exemplary embodiment of the present invention.

FIG. 8 illustrates an example of a collation target face data list according to the exemplary embodiment of the present invention.

FIG. 10 illustrates an example of a registered apparatus table according to the exemplary embodiment of the present invention.

FIG. 12 illustrates an example of a collation target face data list according to the exemplary embodiment of the present invention.

FIG. 21 is a flow chart that illustrates an example of processing for setting the number of prints according to a fourth exemplary embodiment of the present invention.

FIG. 22 is a flow chart that illustrates an example of image data transmission processing according to the fourth exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
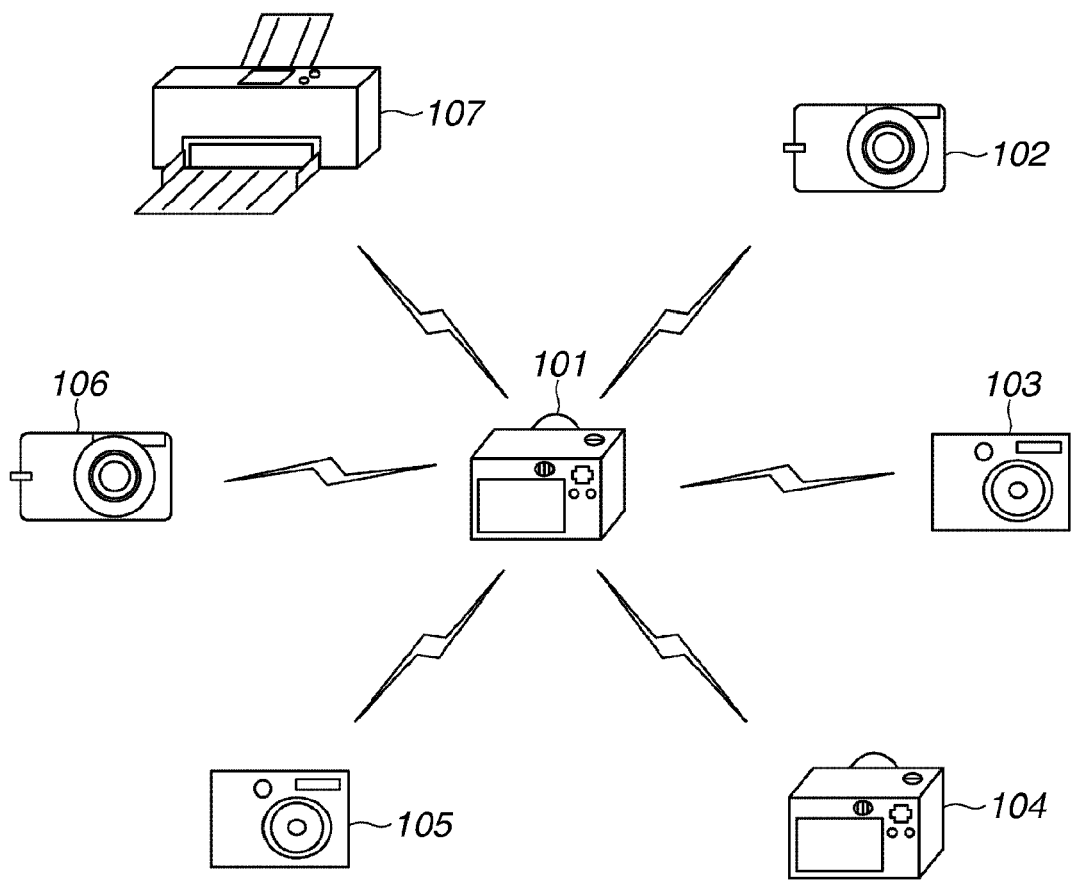
FIG. 1 illustrates an example of a configuration of an image transmission system according to an exemplary embodiment of the present invention.

A first exemplary embodiment of the present invention will now be described below. FIG. 1 illustrates an example of a configuration of an image transmission system according to the present exemplary embodiment. The image transmission system according to the present exemplary embodiment uses the wireless universal serial bus (WUSB) standard based on the ultra wide band (UWB) method as a wireless communication system.

Referring to FIG. 1, the image transmission system is constituted by a digital camera 101, digital cameras 102 through 106, and a printing apparatus (printer) 107. The digital camera 101 functions as an image processing apparatus to which the present invention is applied. Each of the digital cameras 102 through 106 is an external apparatus.

The digital camera 101 operates as a WUSB host device. Each of the digital cameras 102 through 106, which is an external apparatus, and the printer 107 operate as a WUSB client device.

According to the WUSB standard, the digital camera 101, as the WUSB host device, establishes a communication path separately and independently with respect to each of the digital cameras 102 through 106 and the printer 107 to perform data communication with them.

Figure 2:
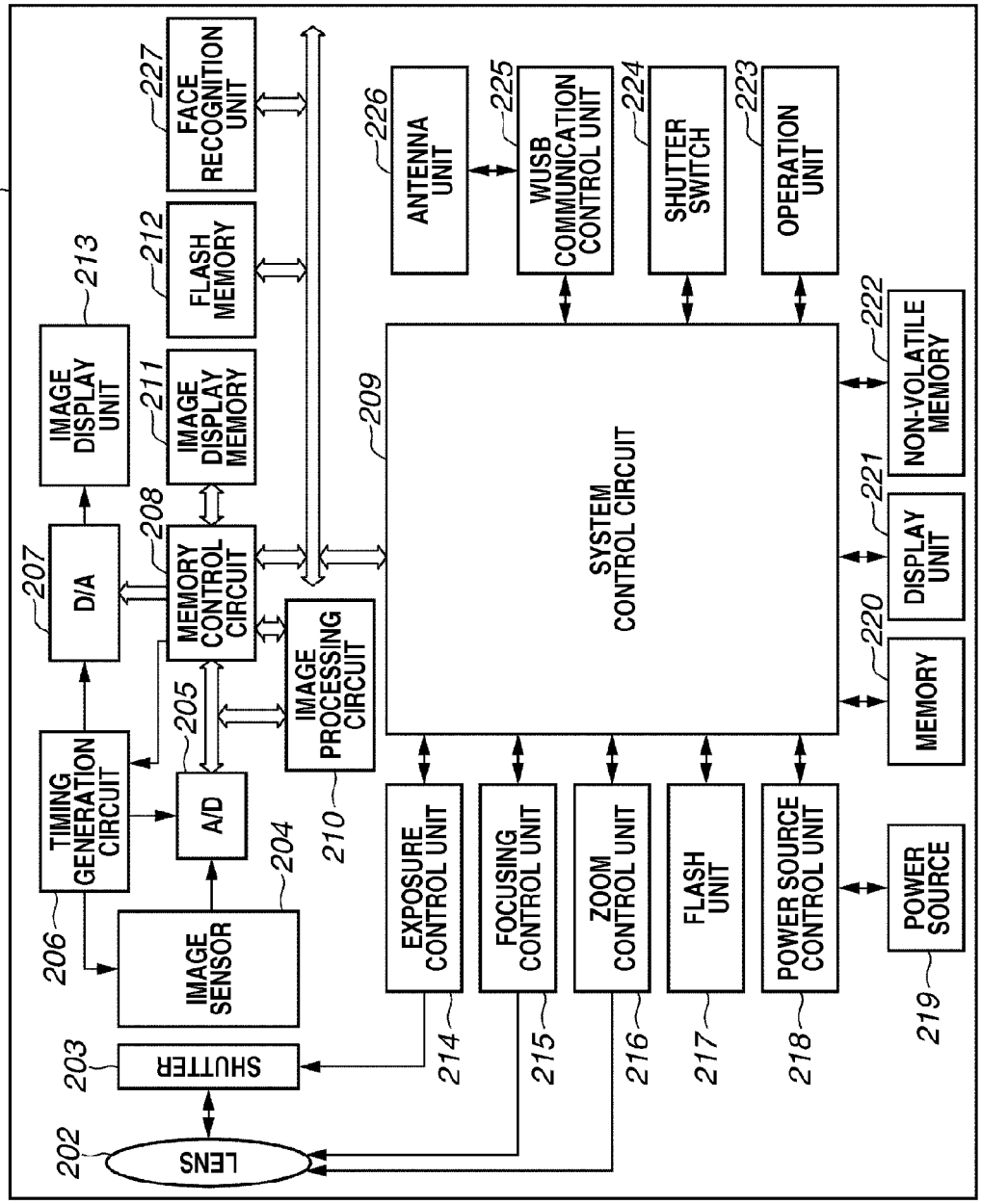
FIG. 2 illustrates an example of a configuration of a digital camera according to the exemplary embodiment of the present invention.

FIG. 2 illustrates an example of a configuration of the digital camera 101 according to the present exemplary embodiment. Referring to FIG. 2, the digital camera 101 includes a photographing lens 202. A shutter 203 includes a function as an aperture stop. An image sensor 204 converts an optical image into an electric signal.

An analog/digital (A/D) converter 205 converts an analog signal output from the image sensor 204 into a digital signal.

A timing generation circuit 206 supplies a clock signal and a control signal to the image sensor 204, the A/D converter 205, and a digital/analog (D/A) converter 207. The timing generation circuit 206 is controlled by a memory control circuit 208 and a system control circuit 209. The D/A converter 207 converts a digital signal into an analog signal.

The memory control circuit 208 controls the A/D converter 205, the timing generation circuit 206, an image processing circuit 210, an image display memory 211, the D/A converter 207, and a flash memory 212.

Data converted by the A/D converter 205 is written on the image display memory 211 or the flash memory 212 via the image processing circuit 210 and the memory control circuit 208 or directly on the image display memory 211 or the flash memory 212 controlled by the memory control circuit 208.

The system control circuit 209 controls the entire operation of the digital camera 101. The image processing circuit 210 performs predetermined pixel interpolation processing and color conversion processing on the data from the A/D converter 205 or the data from the memory control circuit 208.

Furthermore, the digital camera 101 includes the image display memory 211. The flash memory 212 stores a captured still image or moving image. The flash memory 212 has a memory capacity large enough to store a predetermined number of still images and a predetermined time length of data for a moving image. In the case of a digital camera, the flash memory 212 is generally equivalent to a removable card type flash memory such as a secure digital (SD) memory card.

An image display unit 213 is constituted by a thin film transistor (TFT) display or a liquid crystal display (LCD). The image data for display that has been written and stored on the image display memory 211 is displayed on the image display unit 213 via the D/A converter 207. An electronic view finder function can be implemented by sequentially displaying the captured image data with the image display unit 213.

An exposure control unit 214 controls the shutter 203 including an aperture function. The exposure control unit 214 includes a flash light intensity control function performed in cooperation with a flash 217.

A focusing control unit 215 controls the focusing of the photographing lens 202. A zoom control unit 216 controls the zooming of the photographing lens 202. The flash 217 includes a function for projecting an automatic focusing (AF) auxiliary light and a flash light intensity control function.

A power source control unit 218 is constituted by a battery detecting circuit, a direct current to direct current (DC-DC) converter, and a switching circuit for switching blocks to be energized. The power source control unit 218 detects whether a battery cell has been mounted, the type of the mounted battery cell, and the remaining capacity of the mounted battery cell.

Furthermore, the power source control unit 218 controls the DC-DC converter according to a result of the above-described detection and an instruction from the system control circuit 209. Accordingly, the power source control unit 218 supplies a necessary voltage to each unit and circuit including a recording medium drive for a desired and necessary length of time period.

A power source unit 219 is constituted by a primary battery such as an alkaline battery or a lithium battery, a secondary battery such as a NiCd battery, an NiMH battery, or an Li battery, or an alternate current (AC) adapter.

A memory 220 stores a constant and a variable, a program, and a WUSB communication application for an operation of the system control circuit 209. Furthermore, the memory 220 stores registered face data (the data of a face image used for identifying a person) used to identify a person captured in an image (included in an image).

When a program is executed by the system control circuit 209, a display unit 221 displays the operation state of the digital camera 101, a menu screen, and a message, using a text, image data, and audio data. At least one display unit 221 is disposed at a position around an operation unit 223 of the digital camera 101 at which the user can easily see the display. The display unit 221 is constituted by a combination of a liquid crystal display (LCD), a light-emitting diode (LED), and a sound generation device.

It is also useful if the image display unit 213 of the digital camera 101 also displays information to be displayed on the display unit 221.

Furthermore, the digital camera 101 includes an electrically rewritable non-volatile memory (random access memory (RAM)) 222. The operation unit 223 can be operated by the user (operator) to input an instruction for performing various operations of the system control circuit 209. The operation unit 223 includes one or more switches, buttons, mode dials, touch panels, a pointing device that performs a pointing operation by detecting a line of sight, and an audio information recognition device.

A shutter switch 224 can be operated by the user to issue an instruction for starting a series of processing for writing a signal read from the image sensor 204 on the flash memory 212 as image data.

The operation instructed by the user here includes exposure processing and development processing. The exposure processing is performed in writing the image signal read from the image sensor 204 on the flash memory 212 via the A/D converter 205 and the memory control circuit 208. The development processing is performed using a calculation made by the image processing circuit 210 and the memory control circuit 208.

The WUSB communication control unit 225 controls an operation of the digital camera 101, which operates as the WUSB host device. In addition, the digital camera 101 includes an antenna unit 226. The WUSB communication control unit 225 controls a data communication with an externally connected WUSB device by a radio wave from the antenna unit 226. The antenna unit 226 controls a data communication by UWB communication that is a physical layer of the WUSB standard.

A face recognition unit 227 reads the image data recorded on the flash memory 212 and detects a position at which the face of the person is included in the image data to extract face data. Moreover, the face recognition unit 227 counts the number of persons captured in the image.

Furthermore, the face recognition unit 227 collates the registered data read from the memory 220 with the face data extracted from the image data. Various methods for recognizing a face of a person have been discussed and utilized, and an arbitrary face recognition method can be used in the present exemplary embodiment. Accordingly, the face recognition method will not be described in detail below.

Figure 3:
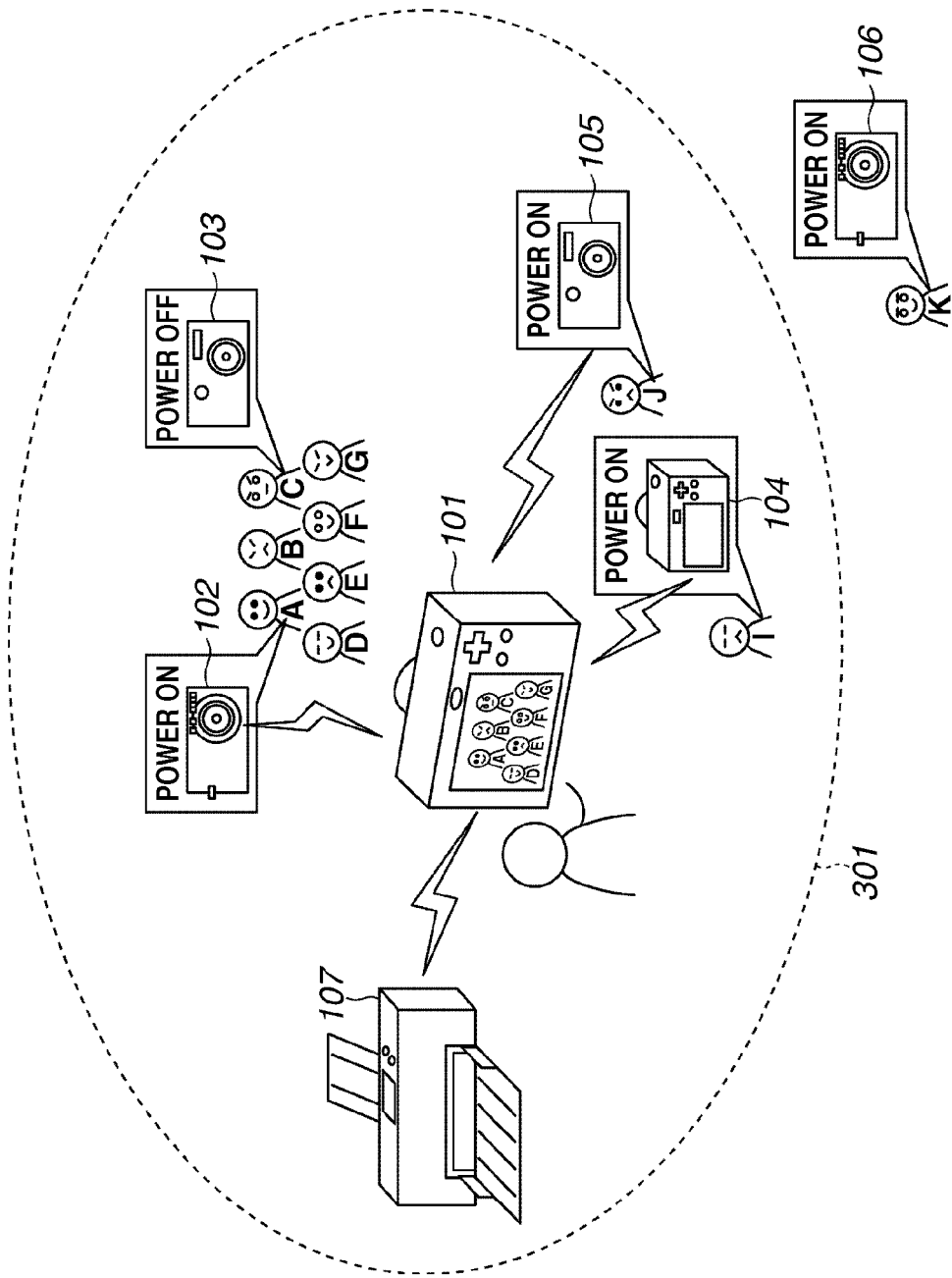
FIG. 3 illustrates an example of the digital camera, a printer, a layout of persons captured in an image, and a state of the digital camera according to the exemplary embodiment of the present invention.

FIG. 3 illustrates the digital cameras 101 through 106, the printer 107, the layout and the state of persons in an image. Referring to FIG. 3, a person A owns the digital camera 102, which has been powered on. A person C owns the digital camera 103, which has been powered off. A person I owns the digital camera 104, which has been powered on. A person J owns the digital camera 105, which has been powered on. A person k owns the digital camera 106, which has been powered on.

The digital camera 101 can perform the WUSB communication in an area 301. More specifically, each of the digital cameras 102, 103, 104, and 105 and the printer 107 exists in the area 301, in which the digital camera 101 are in communication with the digital cameras 102 through 105. On the other hand, the digital camera 106 does not exist in the area 301, in which the communication with the digital camera 101 is available.

Here, it is assumed that the persons A through G are included in the image captured with the digital camera 101.

In the following, processing performed by the digital camera 101 according to the first exemplary embodiment will be described. In the first exemplary embodiment, the digital camera 101 performs a photographing operation in a photographing mode. Furthermore, the digital camera 101 sets the number of prints and performs printing.

If a person who corresponds to the face data registered in any of the digital cameras 102 through 106 is included in the captured image, then the image data is transmitted to the corresponding digital camera (any of the digital cameras 102 through 106). Then, the system control circuit 209 of the digital camera 101 subtracts the number of the registered face data corresponding to the digital cameras 102 through 106, to which the image data has been successfully transmitted, from the total number of persons captured in the image. Furthermore, the system control circuit 209 sets a number obtained as a result of the subtraction as the number of prints.

Each of FIGS. 4, 5, 9, and 11 is a flow chart that illustrates an example of processing for setting the number of prints in the first exemplary embodiment. When the operator powers on the digital camera 101 and operates the mode dial of the operation unit 223 to set the digital camera 101 to the photographing mode, the digital camera 101 performs the following processing as illustrated in a flow chart of FIG. 4.

The processing in a flow chart according to the present exemplary embodiment is implemented by controlling the various parts of the digital camera 101 with the system control circuit 209 according to a signal input from each part or the program. The same applies to other exemplary embodiments of the present invention.

Figure 4:
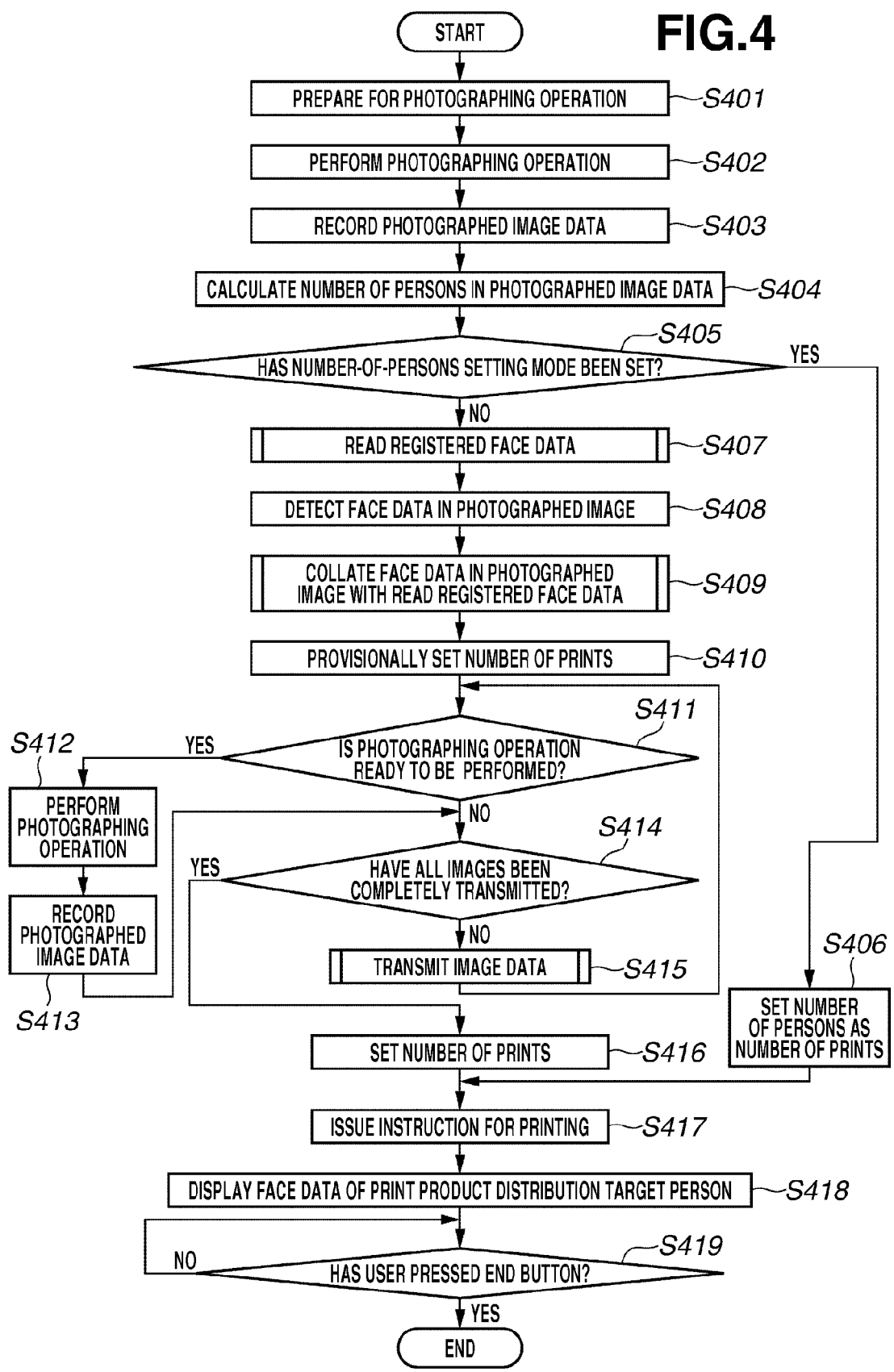
FIG. 4 is a flow chart that illustrates an example of processing for setting the number of prints in a first exemplary embodiment of the present invention.

Referring to FIG. 4, in step S401, when the operator half-presses the shutter switch 224, the system control circuit 209 prepares for starting a photographing operation such as automatic focusing processing. In step S402, when the operator fully-presses the shutter switch 224, the system control circuit 209 performs processing for photographing an image. In step S403, the system control circuit 209 records the photographed image data in the flash memory 212.

In step S404, the face recognition unit 227 detects the face of the person captured in the photographed image. Then, the face recognition unit 227 counts the number of persons captured in the photographed image based on the number of the detected faces of the persons.

More specifically, the face recognition unit 227 reads the image data recorded in the flash memory 212 in step S403. Then, the face recognition unit 227 detects the positions in the image at which the faces of the persons are located, from the read image data. The face recognition unit 227 counts the number of persons captured in the image. Then, the face recognition unit 227 stores the counted number of persons in the memory 220. In the example illustrated in FIG. 3, in total, seven persons, namely, the persons A through G, are included in the image.

In step S405, the system control circuit 209 determines whether a "number-of-persons setting mode" or a "number-of-prints automatic setting mode" has been set as a mode for setting the number of prints.

The "number-of-persons setting mode" is the mode for setting the number of persons captured in the image as it is as the number of prints. The "number-of-prints automatic setting mode" is a mode for appropriately setting the number of prints according to the state of the communication with other apparatuses. The operator previously sets either one of the above-described modes via a menu screen.

If it is determined in step S405 that the mode for setting the number of prints has been set to the "number-of-persons setting mode" (YES in step S405), then the processing advances to step S406. In step S406, the system control circuit 209 sets the number of persons captured in the image, which has been counted and stored on the memory 220 in step S403, as the number of prints. Then, the processing advances to step S417.

On the other hand, if it is determined in step S405 that the mode for setting the number of prints has been set to the "number-of-prints automatic setting mode" (NO in step S405), then the processing advances to step S407. In step S407, the system control circuit 209 reads the face data registered in the digital cameras 102 through 106.

Figure 5:
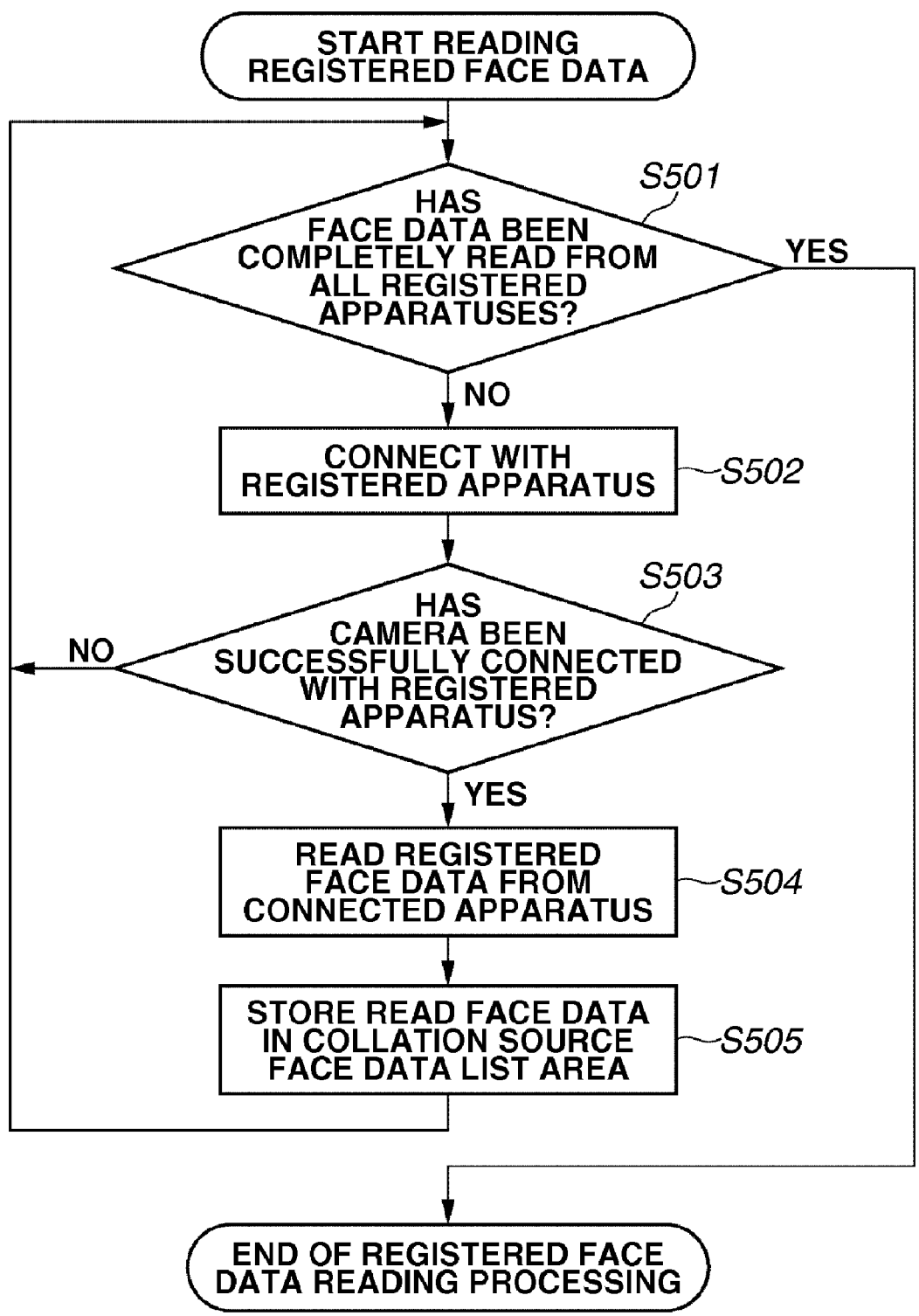
FIG. 5 is a flow chart that illustrates an example of processing for reading registered face data according to the first exemplary embodiment of the present invention.

FIG. 5 is a flow chart that illustrates an example of processing for reading the registered face data in step S407 of FIG. 4. FIG. 6 illustrates an example of a registered apparatus table holding information about the registered apparatuses registered as the WUSB device, with which the digital camera 101 performs the WUSB communication, according to the present exemplary embodiment.

The face data of the person associated with the digital cameras 102 through 106 is registered in the registered apparatus table. The registered apparatus table is stored on the memory 220, which is the storage unit.

In the registered apparatus table illustrated in FIG. 6, a registration name of each of the digital cameras 102 through 106 and the printer 107 is registered in a "name" column 601.

More specifically, in the example illustrated in FIG. 6, the digital camera 102 is registered as a "camera 2". The digital camera 103 is registered as a "camera 3". The digital camera 104 is registered as a "camera 4". In the same way, the digital camera 105 is registered as a "camera 5". The digital camera 106 is registered as a "camera 6". The printer 107 is registered as a "printer".

A connection context is registered in a "connection context" column 602. When the digital cameras 102 through 106 and the printer 107, which are the WUSB devices, enter into the communication with the digital camera 101, which is the WUSB host device, authentication processing (4-way handshake) is performed. The connection context is necessary at this stage.

It is necessary to previously share the registration name of each of the digital cameras 102 through 106 and the printer 107 and the connection context among the digital camera 101, the digital cameras 102 through 106, and the printer 107 by performing association processing such as cable association. With respect to the registration name, a "device friendly name", which is acquired from the WUSB device by the association process, is used as it is as the registration name.

In a "registered face data" column 603, face data is registered as identification information for identifying image data to be transmitted to each of the digital cameras 102 through 106. The face data is previously obtained by a communication among the digital camera 101 and the digital cameras 102 through 106.

The digital camera 102, whose registration name is the "camera 2", registers the face data of the persons A and B in the digital camera 101.

The owner of the digital camera 102 is the person A. Therefore, in the digital camera 102, the face data of the person A, who is the owner of the digital camera 102, and the face data of the person B, who has a specific relationship with the owner person A, is registered.

For example, in the case where the person A and the person B belongs to the same family, the face data of the person A and the person B may be registered in the digital camera 101 in order to transmit and centrally store and manage the image data including each of the persons A and B.

In another case, it may be assumed that image data including the person B is transmitted to the digital camera 102 and that the person A transmits the image data to the person B or distributes a print product of the image data printed by the person A later. In this case, the face data of each of the person A and the person B may have been registered in the digital camera 101.

In the same manner, with respect to the digital camera 103, whose registration name is the "camera 3", the face data of the persons C and H is registered in the digital camera 101.

Further, with respect to the digital camera 104, whose registration name is the "camera 4", the face data of the persons A, F, and I is registered in the digital camera 101.

In addition, with respect to the digital camera 105, whose registration name is the "camera 5", the face data of the person J is registered in the digital camera 101. Further, with respect to the digital camera 106, whose registration name is the "camera 6", the face data of the persons D and K is registered in the digital camera 101.

In a "transmission target flag" column 604, a flag is stored indicating whether image data that can be transmitted to the registered apparatus in which the face data has been registered exists. Currently, the system control circuit 209 has not determined whether image data that can be transmitted to the registered apparatus exists. Therefore, a parameter "FALSE" has been currently set for the transmission target flag 604 with respect to each of the digital cameras 102 through 106.

Processing for reading the registered face data from the registered apparatus table illustrated in FIG. 6 will now be described below with reference to a flow chart of FIG. 5.

Referring to FIG. 5, in step S501, the digital camera 101 determines whether the registered face data has been completely read from all the apparatuses in which the face data has been registered.

If it is determined in step S501 that the registered face data has been completely read from all the apparatuses in which the face data has been registered (YES in step S501), then the digital camera 101 ends the processing for reading the registered face data.

On the other hand, if it is determined in step S501 that the registered face data has not been completely read from all the apparatuses (NO in step S501), then the processing advances to step S502.

In step S502, the digital camera 101 connects with the registered apparatus from which the face data registered therein has not been read yet.

In the present exemplary embodiment, the digital camera 101 performs the connection starting from the digital camera listed at the top of the registered device table (FIG. 6), namely, in ascending numeric order from the "camera 2" to the "camera 6". More specifically, the digital camera 101 at first performs the connection with the digital camera 102, whose registration name is the "camera 2". Then, the processing advances to step S503.

In step S503, the digital camera 101 determines whether the connection has been successfully established (whether the communication with the digital camera is available). If it is determined in step S503 that the connection has been successfully established (YES in step S503), then the processing advances to step S504. On the other hand, if it is determined in step S503 that the connection has not been successfully established (NO in step S503), then the processing returns to step S501.

In the layout of captured persons and the state of each digital camera illustrated in FIG. 3, the digital camera 102, whose registration name is the "camera 2", can communicate with the digital camera 101. Therefore, in this case, the processing advances to step S504.

The processing in step S503 is performed to read the face data related to the digital camera whose connection with the digital camera 101 has been established.

After reading the face data with respect to one digital camera, it is necessary to establish the connection with another digital camera. Accordingly, the digital camera 101 discontinues the current connection to establish the connection with another digital camera.

In step S504, the digital camera 101 reads the registered face data from the connection target apparatus. The face data registered in the "camera 2" is the face data of the person A and the person B. The digital camera 101 reads the face data registered in the "camera 2" from the memory 220.

In step S505, the digital camera 101 stores the registered face data read from the memory 220 in step S504 in an area for the collation source face data list separately provided on the memory 220. Then, the processing returns to step S501.

Here, only reading of the face data registered in the "camera 2" has been completed by this time. More specifically, the digital camera 101 has not completely read the registered face data with respect to all the apparatuses (the digital cameras 102 through 106) by this time. Accordingly, the processing advances to step S502.

In step S502, the digital camera 101 tries to connect with the digital camera 103, which is the "camera 3". Then, the processing advances to step S503.

In the state of each digital camera illustrated in FIG. 3, the digital camera 103, which is the "camera 3", has been powered off and thus cannot communicate with the digital camera 101. Accordingly, in this case, the digital camera 101 does not read the registered face data and returns to step S501.

Here, the digital camera 101 has not read the registered face data with respect to all apparatuses (the digital cameras 102 through 106) yet. Accordingly, the processing advances to step S502.

In step S502, the digital camera 101 tries to connect with the digital camera 104, which is the "camera 4". Then, the processing advances to step S503.

In the layout of captured persons and the state of each digital camera illustrated in FIG. 3, the digital camera 104, which is the "camera 4", can communicate with the digital camera 101. Accordingly, the processing advances to step S504.

In step S504, the digital camera 101 reads the face data of the persons A, F, and I, which is registered in the "camera 4", from the memory 220.

As illustrated in FIG. 6, both the "camera 2" and the "camera 4" register the face data of the person A. The registered face data is prepared in the digital cameras 102 and 104, which are the transmission source apparatus, before registering the face data in the digital camera 101.

In this case, the same image data that has been obtained and shared by both the digital cameras 102 and 104 can be used as the face data of the person A. Alternatively, mutually different data, namely, face data that has been separately photographed, can be used as the face data of the person A.

In the present exemplary embodiment, if it is determined by the face recognition unit 227 that the registered face data indicates the same person regardless of whether the same face data has been registered in the "camera 2" and the "camera 4", the digital camera 101 does not separately store the face data in the collation source face data list. Thus, the present exemplary embodiment can appropriately reduce the number and the total size of the registered collation source face data.

Note that the face data may also be separately stored in the area for the collation source face data list regardless of whether the same face data has been registered in the "camera 2" and the "camera 4".

Accordingly, the digital camera 101 adds and stores only the face data of the person F and the person I in the area for the collation source face data list separately provided on the memory 220. Then, the processing returns to step S501.

At this stage, the digital camera 101 has not yet completely read the registered face data with respect to all apparatuses (the digital cameras 102 through 106). Accordingly, the processing advances to step S502.

In step S502, the digital camera 101 tries to connect with the digital camera 105, which is the "camera 5". Then, the processing advances to step S503.

In the layout of captured persons and the state of each digital camera illustrated in FIG. 3, the digital camera 105 (the "camera 5"), can communicate with the digital camera 101. Accordingly, the processing advances to step S504.

In step S504, the digital camera 101 reads the face data of the person J, which is the face data registered in the "camera 5", from the memory 220.

In step S505, the digital camera 101 adds and stores the face data of the person J in the area for the collation source face data list separately provided on the memory 220. Then, the processing returns to step S501.

At this stage, the digital camera 101 has not yet completely read the registered face data with respect to all apparatuses (the digital cameras 102 through 106). Accordingly, the processing advances to step S502.

In step S502, the digital camera 101 tries to connect with the digital camera 106, which is the "camera 6". Then, the processing advances to step S503.

In the layout of captured persons and the state of each digital camera illustrated in FIG. 3, the digital camera 106 (the "camera 6"), does not exist in the area 301 where the WUSB communication with the digital camera 101 is available. Thus, the digital camera 106 cannot communicate with the digital camera 101. Accordingly, in this case, the digital camera 101 does not read the registered face data and returns to step S501.

After completely reading the registered face data with respect to all the registered apparatuses, the digital camera 101 ends the processing for reading the registered face data.

At the time the reading of registered face data is completely performed, the digital camera 101 stores the face data of the persons A, B, F, I, and J in the collation source face data list separately provided on the memory 220 together with the registration source information (the registration name of the registered apparatus) as illustrated in FIG. 7.

Returning to FIG. 4, in step S408, the face recognition unit 227 reads the image data recorded on the flash memory 212 in step S403. Then, the face recognition unit 227 detects the position of the read image at which the face of the person is located. Then, the face recognition unit 227 extracts the face data and stores the extracted face data in the area for the collation target face data list provided on the memory 220.

In the present exemplary embodiment, the persons A through G are captured and included in the photographed image data. Accordingly, the collation target face data list is as illustrated in FIG. 8. An "image transmission completion flag" is included in the collation target face data list.

The "image transmission completion flag" is a flag that indicates whether the image data with respect to each person has been transmitted. The image transmission completion flag is set if the image data has been successfully transmitted to the digital cameras 102 through 106 in step S415 which will be described below. At this stage, the digital camera 101 has not yet transmitted the image data to the digital cameras 102 through 106. Accordingly, a parameter "FALSE" has been currently set for the transmission target flag with respect to each of the persons A through G.

Further, a "matching flag" is included in the collation target face data list. The "matching flag" is a flag that indicates whether the face data of each person has been determined to correspond to the collation source face data as a result of a collation performed in step S903 (FIG. 9) which will be described below.

Here, the digital camera 101 has not yet performed the collation. Accordingly, a parameter "FALSE" has been currently set for each of the persons A through C.

In step S409, the face recognition unit 227 collates the collation source face data list illustrated in FIG. 7 and the collation target face data list illustrated in FIG. 8. More specifically, the face recognition unit 227 collates the face data extracted from the image data with the registered face data read from the memory 220.

Figure 9:
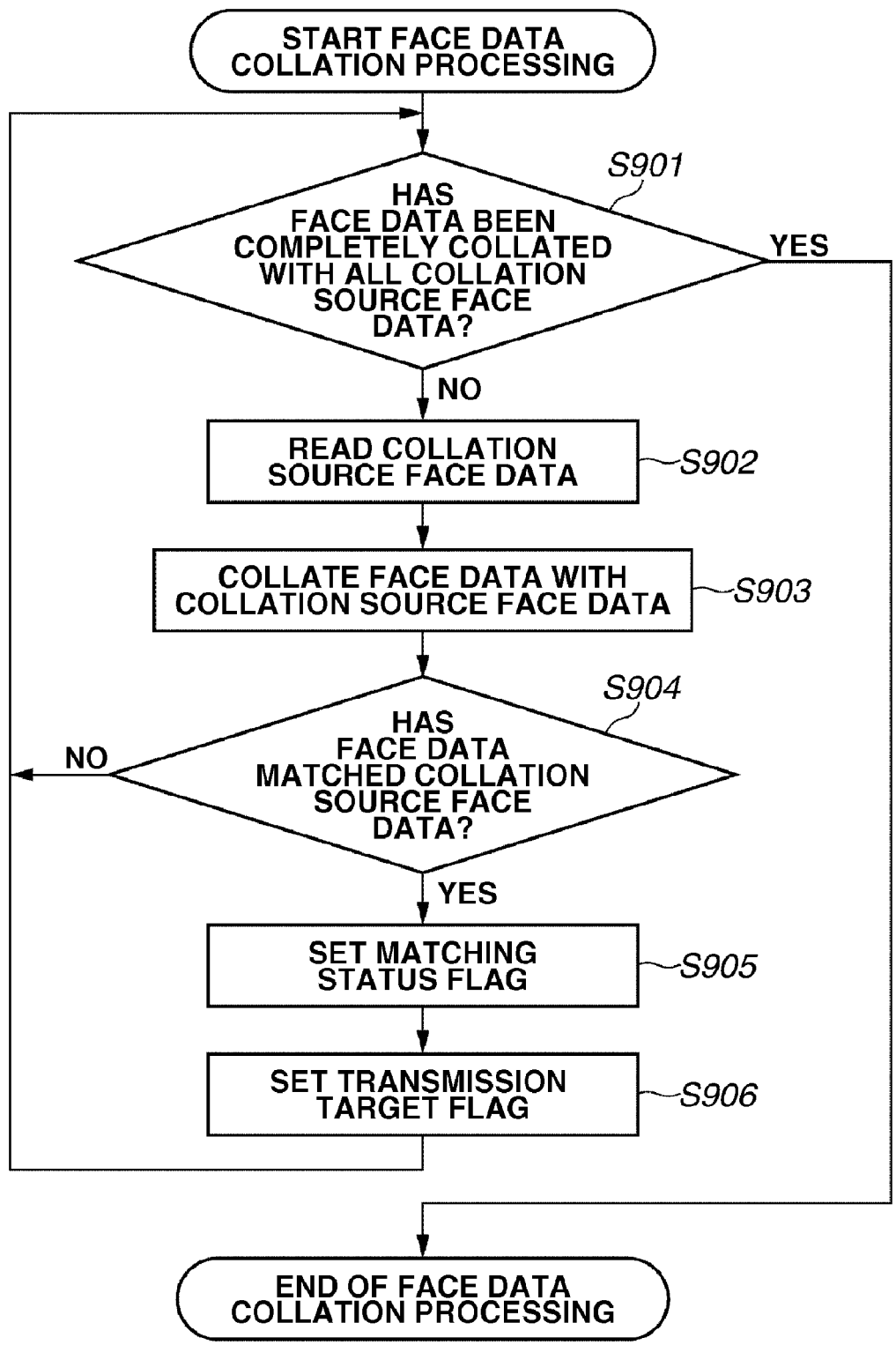
FIG. 9 is a flow chart that illustrates an example of face data collation processing according to the first exemplary embodiment of the present invention.

FIG. 9 is a flow chart that illustrates an example of face data collation processing in step S409 of FIG. 4.

Referring to FIG. 9, in step S901, the face recognition unit 227 determines whether the collation has been completely performed on all the collation source face data. If it is determined in step S901 that the collation has been completed on all the collation source face data (YES in step S901), then the face recognition unit 227 ends the face data collation processing. On the other hand, if it is determined in step S901 that the collation has not been completely performed on all the collation source face data (NO in step S901), then the processing advances to step S902.

In step S902, the face recognition unit 227 reads the collation source face data. In the present exemplary embodiment, the face recognition unit 227 performs the collation starting from the person at the top of the collation source face data list illustrated in FIG. 7, namely, in order of the person A, the person B, the person F, the person I, and the person J. At first, the face recognition unit 227 reads the face data of the person A from the collation source face data list stored on the memory 220. Then, the processing advances to step S903.

In step S903, the face recognition unit 227 performs the collation of the face data. More specifically, the face recognition unit 227 reads the face data from the collation target face data list stored on the memory 220 in order from the person A to the person G.

Then, the face recognition unit 227 collates the respective read face data with the face data of the person A (the collation source face data) read in step S902. Then, the processing advances to step S904.

In step S904, the face recognition unit 227 determines whether the face data that corresponds to the collation source face data exists in the collation target data list according to a result of the collation in step S903.

If it is determined in step S904 that the face data that corresponds to the collation source face data exists in the collation target data list (YES in step S904), then the processing advances to step S905. On the other hand, if it is determined in step S904 that the face data that corresponds to the collation source face data does not exist in the collation target data list (NO in step S904), then the processing returns to step S901.

In the case where the collation source is the person A, the face data of the person A is included also in the collation target face data list. In other words, the person A is included in the captured image. Accordingly, in this case, the processing advances to step S905.

In step S905, the system control circuit 209 sets the matching flag. More specifically, the system control circuit 209 sets a parameter "TRUE" to the matching flag related to the collation target face data that has been determined to correspond to the collation source face data as a result of the collation in step S903.

In the example illustrated in FIG. 8, the system control circuit 209 sets a parameter "TRUE" to the matching flag (FIG. 8) related to the person A (see FIG. 12). In step S906, the system control circuit 209 sets an image transmission target flag.

Here, a registration source of the person A in the collation source face data list illustrated in FIG. 7 is the digital camera 102, which is the "camera 2". Accordingly, the system control circuit 209 sets a parameter "TRUE" to the transmission target flag for the "camera 2" in the registered apparatus table illustrated in FIG. 6. Then, the processing returns to step S901.

In the example illustrated in FIG. 3, the person A, who has been registered related to the "camera 2", is included in the image. Accordingly, it is indicated by the image transmission target flag that the transmission of the image to the "camera 2" is effective.

At this stage, the digital camera 101 has not completely performed the collation with respect to all the collation source face data. Accordingly, the processing advances to step S902.

In step S902, the face recognition unit 227 reads the face data of the person B from the collation source face data list stored on the memory 220. Then, the processing advances to step S903. In step S903, the face recognition unit 227 collates the read face data of the person B with the face data stored in the collation target face data list.

In the case where the collation source is the person B, the collation target face data list includes the face data of the person B. In other words, the person B is included in the captured image. Accordingly, the processing advances to step S905.

In step S905, the system control circuit 209 sets a parameter "TRUE" to the matching flag (FIG. 8) related to the person B (see FIG. 12). In step S906, the system control circuit 209 sets the image transmission target flag.

Here, the registration source of the person B in the collation source face data list illustrated in FIG. 7 is the digital camera 102, which is the "camera 2". With respect to the "camera 2", a parameter "TRUE" has already been set to the image transmission target flag for the "camera 2" because it was determined that the face data of the person A corresponds to the collation source face data in step S903. Accordingly, in this case, the system control circuit 209 does not perform the operation for setting the transmission target flag. Then, the processing returns to step S901.

At this stage, the digital camera 101 has not completely performed the collation with respect to all the collation source face data (NO in step S901). Accordingly, the processing advances to step S902.

In step S902, the face recognition unit 227 reads the face data of the person F from the collation source face data list stored on the memory 220. Then, the processing advances to step S903.

In step S903, the face recognition unit 227 collates the face data of the person F with the face data stored in the collation target face data list. In the case where the collation source is the person F, the collation target face data list includes the face data of the person F. In other words, the person F is included in the captured image. Accordingly, in this case, the processing advances to step S905.

In step S905, the system control circuit 209 sets a parameter "TRUE" to the matching flag (FIG. 8) related to the person F (see FIG. 12). In step S906, the system control circuit 209 sets the image transmission target flag.

The registration source of the person F in the collation source face data list illustrated in FIG. 7 is the digital camera 104, which is the "camera 4". Accordingly, in this case, the system control circuit 209 sets a parameter "TRUE" to the image transmission target flag for the "camera 4" registered in the registered apparatus table illustrated in FIG. 6. Then, the processing returns to step S901.

In this case, the person F, who has been registered with respect to the "camera 4", is included in the image. Accordingly, the parameter "TRUE" set to the image transmission target flag indicates that the transmission of the image data to the "camera 4" is effective.

At this stage, the digital camera 101 has not completely performed the collation with respect to all the collation source face data. Accordingly, in this case, the processing advances to step S902.

In step S902, the face recognition unit 227 reads the face data of the person I from the collation source face data list stored on the memory 220. Then, the processing advances to step S903. In step S903, the face recognition unit 227 collates the read face data of the person I with the face data stored in the collation target face data list.

In the case where the collation source is the person I, the face data of the person I is not stored in the collation target face data list. In other words, the person I is not included in the captured image. Accordingly, the processing returns to step S901.

At this stage, the digital camera 101 has not completely performed the collation with respect to all the collation source face data. Accordingly, in this case, the processing advances to step S902.

In step S902, the face recognition unit 227 reads the face data of the person J from the collation source face data list stored on the memory 220. Then, the processing advances to step S903.

In step S903, the face recognition unit 227 collates the read face data of the person J with the face data stored in the collation target face data list.

In the case where the collation source is the person J, the face data of the person J is not stored in the collation target face data list. In other words, the person J is not included in the captured image. Accordingly, in this case, the processing returns to step S901.

Thus, the collation with respect to all the collation source face data is completed. Accordingly, the system control circuit 209 ends the face data collation processing.

FIG. 10 illustrates a state of the registered apparatus table illustrated in FIG. 6 after performing the face data collation processing according to the present exemplary embodiment. More specifically, the parameter "TRUE" has been set to the image transmission target flags for the "camera 2" and the "camera 4", which indicate that the "camera 2" and the "camera 4" are the image data transmission targets in step S415, as will be described in detail below.

Returning to FIG. 4, in step S410, the system control circuit 209 performs a provisional setting for the number of prints.

In the example illustrated in FIG. 4, the system control circuit 209 has not yet transmitted the image data. Accordingly, in this case, the system control circuit 209 reads the number of persons captured in the image, which has been counted in step S404 and stored on the memory 220. Then, the system control circuit 209 provisionally sets the read number of persons as the number of prints. Furthermore, the system control circuit 209 stores the provisionally set number of prints on the memory 220.

In the present exemplary embodiment, seven persons in total (i.e., the persons A through G) is the number of persons captured in the image. Accordingly, the system control circuit 209 sets a parameter value "7 copies" as the provisional setting value.

Here, the digital camera 101 is in the photographing mode. Accordingly, the operator may quickly start a photographing operation. In that case, the system control circuit 209 suspends the processing for setting the number of prints and resumes the processing for setting the number of prints that has been suspended after the photographing operation is completed. Accordingly, it is necessary to store the state of the number of prints before the number of prints as the provisional setting value is set.

In step S411, the system control circuit 209 determines whether the digital camera 101 is ready to start photographing. If it is determined in step S411 that the digital camera 101 is not ready to start photographing (NO in step S411), then the processing advances to step S414.

On the other hand, if it is determined in step S411 that the digital camera 101 is ready to start photographing because, for example, the user has half-pressed the shutter switch 224 (YES in step S411), then the processing advances to step S412.

In step S412, the system control circuit 209 performs the image photographing operation. In step S413, the system control circuit 209 stores the image data photographed in step S412 on the flash memory 212. Then, the processing advances to step S414.

In step S414, the system control circuit 209 determines whether all the image data has been transmitted to the registered apparatus that are the image data transmission targets.

If it is determined in step S414 that all the image data has been transmitted to the registered apparatus that are the image data transmission targets (YES in step S414), then the processing advances to step S416. On the other hand, if it is determined in step S414 that all the image data has not been transmitted to the registered apparatus (NO in step S414), then the processing advances to step S415.

At this time, the digital camera 101 has not performed the image data transmission processing yet. Accordingly, the processing advances to step S415. In step S415, the system control circuit 209 transmits the image data.

Figure 11:
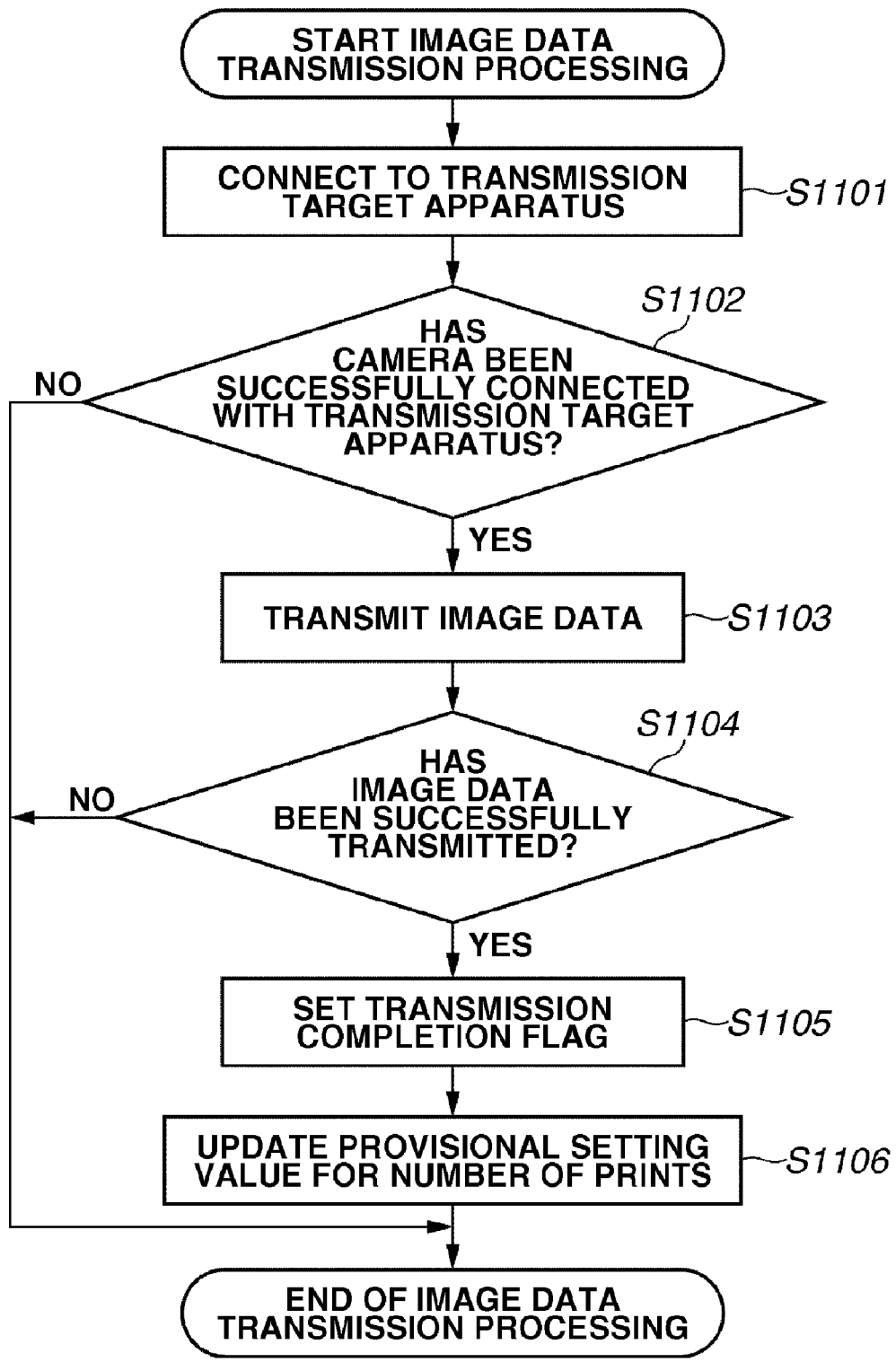
FIG. 11 is a flow chart that illustrates an example of image data transmission processing according to the first exemplary embodiment of the present invention.

FIG. 11 is a flow chart that illustrates an example of image data transmission processing performed in step S415 of FIG. 4 according to the present exemplary embodiment.

Referring to FIG. 11, in step S1101, the system control circuit 209 connects to the registered apparatus that is the image data transmission target. In the present exemplary embodiment, it is necessary to transmit the image data to the "camera 2" and the "camera 4", in which the parameter "TRUE" has been set to the image transmission target flag (FIG. 10).

The system control circuit 209 transmits the image data in order of the digital camera 102, which is the "camera 2", and the digital camera 104, which is the "camera 4". Accordingly, at first, the system control circuit 209 connects with the digital camera 102, which is the "camera 2".

In step S1102, the system control circuit 209 determines whether the connection in step S1101 has been successfully established.

If it is determined in step S1102 that the connection in step S1101 has been successfully established (YES in step S1102), then the processing advances to step S1103. On the other hand, if it is determined in step S1102 that the connection in step S1101 has not been successfully established (NO in step S1102), then the system control circuit 209 ends the image data transmission processing.

In the present exemplary embodiment, the system control circuit 209 determines that the digital camera 102 is in a state where the communication with the digital camera 101 is available. Then, the processing advances to step S1103. In step S1103, the system control circuit 209 transmits the image data. Then, the processing advances to step S1104.

In step S1104, the system control circuit 209 determines whether the image data has been successfully transmitted in step S1103.

If it is determined in step S1104 that the image data has been successfully transmitted in step S1103 (YES in step S1104), then the processing advances to step S1105. On the other hand, if it is determined in step S1104 that the transmission of the image data in step S1103 has not been successfully completed (NO in step S1104), then the system control circuit 209 ends the image data transmission processing.

In the present exemplary embodiment, it is assumed that the image data transmission to the digital camera 102 has been successfully completed. Then, the processing advances to step S1105. In step S1105, the system control circuit 209 sets an image transmission completion flag.

More specifically, in step S1105, the system control circuit 209 sets, among the image transmission completion flags set in the collation target face data list illustrated in FIG. 8, the image transmission completion flag which corresponds to the collation target face data that has been determined to match the face data that has been registered in the digital camera 101 by the registered apparatus that has transmitted the image data in step S1103.

At this stage, the system control circuit 209 has transmitted the image data to the digital camera 102. The collation target face data that has been determined to match the collation source face data in the collation of the face data in step S409 is the face data of the persons A and B (FIG. 8).

Thus, the system control circuit 209 sets a parameter "TRUE" to the image transmission completion flag for the person A and the person B (see FIG. 12). Then, the processing advances to step S1106.

With respect to the persons A and B, among the persons A through G included in the captured image, the system control circuit 209 has transmitted the image data to the apparatus that has requested to send the image data.

In step S1106, the system control circuit 209 updates the provisional setting value for the number of prints. The updating of the provisional setting value is performed by setting a new provisional setting value to the number of the face data for which the parameter "FALSE" is set to the image transmission completion flag in the collation target face data list illustrated in FIG. 8.

After having transmitted the image data to the digital camera 102 as described above, the system control circuit 209 sets a parameter "TRUE" to the image transmission completion flag for the person A and the person B (FIG. 8) in step S1105. Accordingly, the number of the face data for which the parameter "FALSE" is set to the image transmission completion flag is decreased from seven copies to five copies.

Accordingly, the system control circuit 209 updates the provisional setting value, which has been set to "7 copies", to "5 copies". Then, the system control circuit 209 stores the updated setting value "5 copies" on the memory 220. After that, the system control circuit 209 ends the image data transmission processing. Then, the processing advances to step S411 (FIG. 4).

Returning to FIG. 4, in step S411, the system control circuit 209 determines whether the digital camera 101 is ready to start photographing. Then, the processing advances to step S414.

If it is determined in step S411 that the digital camera 101 is ready to start photographing (YES in step S411), then the system control circuit 209 suspends repetition of image data transmission processing. Then, the processing advances to step S412 and step S413.

In step S412 and step S413, the system control circuit 209 photographs image data. Then, the system control circuit 209 stores the captured image data. Then, the processing advances to step S414. In step S414, the system control circuit 209 resumes the repetition of the suspended image data transmission.

At this stage, all the images have not been transmitted to the registered apparatus, which is the image data transmission target. Accordingly, the processing advances to step S415.

In step S1101, the system control circuit 209 connects with the digital camera 104 (the "camera 4") for which the parameter "TRUE" has been set to the transmission target flag (FIG. 10).

In step S1102, the system control circuit 209 determines whether the connection has been successfully established in step S1101. In the present exemplary embodiment, the system control circuit 209 determines that the digital camera 104 is in a state where the communication with the digital camera 101 is available. Then, the processing advances to step S1103.

In step S1103, the system control circuit 209 transmits the image data. Then, the processing advances to step S1104.

In step S1104, the system control circuit 209 determines whether the image data has been successfully transmitted in step S1103. In the present exemplary embodiment, it is assumed that the image data transmission to the digital camera 104 has been successfully performed. Then, the processing advances to step S1105.

In step S1105, the system control circuit 209 sets the image transmission completion flag. In the case of the digital camera 104, the collation target face data that has been determined to correspond to the registered face data in the collation of the face data in step S409 is the face data of the person A and the person F (FIG. 8). Accordingly, the system control circuit 209 sets the parameter "TRUE" to the image transmission completion flag for the person A and the person F.

In this case, the system control circuit 209 has already set a parameter "TRUE" to the image transmission completion flag for the person A at the time of the image data transmission to the digital camera 102. Accordingly, the system control circuit 209 sets a parameter "TRUE" only to the image transmission completion flag for the person F (see FIG. 12). Then, the processing advances to step S1106.

In step S1106, the system control circuit 209 updates the provisional setting value for the number of prints. After having transmitted the image data to the digital camera 104 as described above, the system control circuit 209 sets a parameter "TRUE" to the image transmission completion flag for the person F (FIG. 8) in step S1105. As a consequence, the number of the face data for which the parameter "FALSE" has been set to the image transmission completion flag is decreased from five copies to four copies as illustrated in FIG. 12.

Accordingly, the system control circuit 209 updates the provisional setting value, which has been set to "5 copies", to "4 copies". The system control circuit 209 stores the updated provisional setting value on the memory 220. Then, the system control circuit 209 ends the image data transmission processing. Then, the processing advances to step S411 of FIG. 4.

Returning to FIG. 4, in step S411, the system control circuit 209 determines whether the digital camera 101 is ready to start photographing. Then, the processing advances to step S414.

If it is determined in step S411 that the digital camera 101 is ready to start photographing (YES in step S411), then the system control circuit 209 suspends repetition of the image data transmission processing. Then, the processing advances to step S412 and step S413.

In step S412 and step S413, the system control circuit 209 records the photographed image data. Then, the processing advances to step S414. In step S414, the system control circuit 209 resumes the repetition of the suspended image data transmission processing.

FIG. 12 illustrates a state of the collation target face data list illustrated in FIG. 8 after having performed the above-described processing. More specifically, the matching flag for each of the person A, the person B, and the person F has been set in step S905 and the image transmission completion flag for each of the person A, the person B, and the person F has been set in step S1105.

The transmission of the image data to the digital camera 102, which is the "camera 2", and the digital camera 104, which is the "camera 4", both of which are the image data transmission targets, has been completely performed. Accordingly, the system control circuit 209 determines that all the image data has been transmitted in step S414. Then, the processing advances to step S416.

In step S416, the system control circuit 209 sets the number of prints. More specifically, in step S416, the system control circuit 209 sets a parameter value "4 copies", which is the provisional setting value for the number of prints updated in step S415, as the final number of prints. Then, the system control circuit 209 stores the final number of prints set in this manner on the memory 220.

In step S417, the system control circuit 209 issues an instruction for performing printing. The digital camera 101 WUSB-connects with the printer 107. Then, the digital camera 101 sends, to the printer 107, a print start instruction that includes the parameter value "4 copies" as the setting value for the number of prints stored on the memory 220 and the image data.

In step S418, the system control circuit 209 displays the face data of the person who is the transmission target of the print product, on the display unit 221. Here, the person for whom the parameter "FALSE" has been set to the image transmission completion flag (FIG. 12) is the transmission target of the print product. In the present exemplary embodiment, the person C, the person D, the person E, and the person G are the transmission targets.

Figure 13:
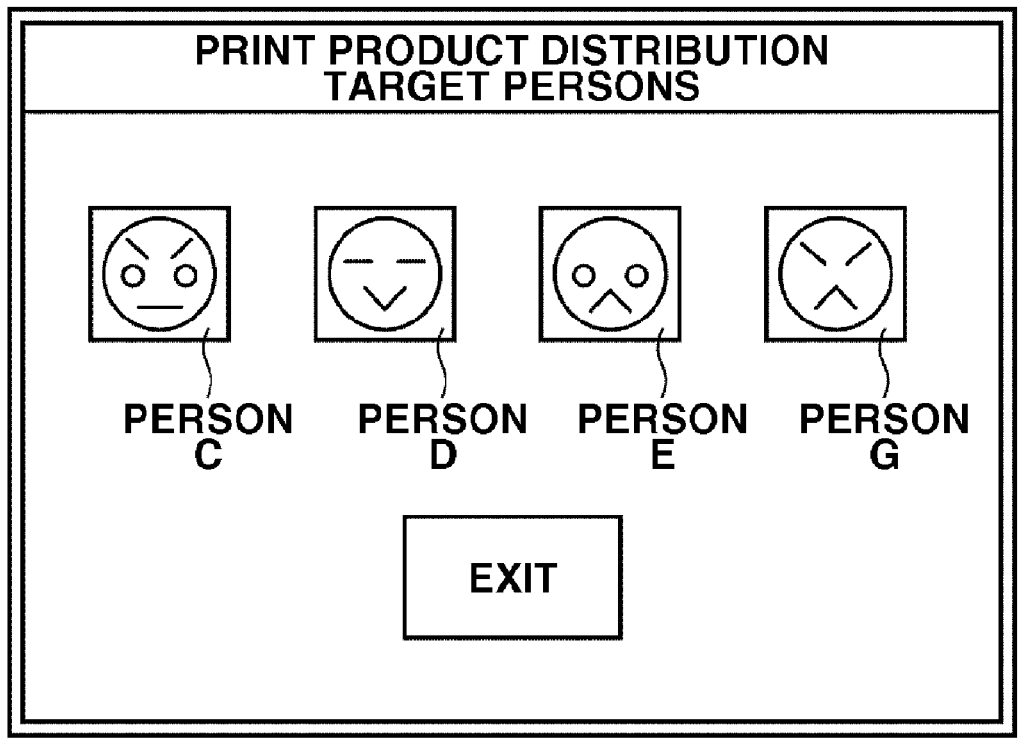
FIG. 13 illustrates an example of a screen that displays information about a person who is a transmission target of a print product according to the exemplary embodiment of the present invention.

Accordingly, as illustrated in FIG. 13, the system control circuit 209 displays the face data of the person C, the person D, the person E, and the person G in the collation target face data list stored on the memory 220, on the display unit 221.

In step S419, the system control circuit 209 determines whether the operator has pressed an exit button via a screen illustrated in FIG. 13. If it is determined in step S419 that the operator has not pressed the exit button (NO in step S419), the processing returns to step S419. Then, the system control circuit 209 repeats the processing in step S419 and determines again whether the operator has pressed the exit button via the screen illustrated in FIG. 13.

If it is determined in step S419 that the operator has pressed the exit button via the screen illustrated in FIG. 13 (YES in step S419), then the system control circuit 209 ends the processing for setting the number of prints. In step S417, the operator issues an instruction for performing printing. In step S418, the operator sees the face image displayed on the screen illustrated in FIG. 13 to verify the transmission target person. When the transmission target person is verified, in step S419, the operator presses the exit button on the screen illustrated in FIG. 13.

Here, as the timing for pressing the exit button, the operator can press the exit button immediately after the face image of the person, who is the transmission target, is displayed. Alternatively, the operator can press the exit button also after the operator obtains the print product generated in the print processing by the printer 107 and collates a print product distribution target person with the person included in the print product to verify the distribution target.

The printer 107 receives the print start instruction and the image data from the digital camera 101. Then, the printer 107 performs the instructed printing of four copies. In step S418, the four printed copies of the print product are transmitted to each of the person C, the person D, the person E, and the person G displayed on the display unit 221.

According to the present exemplary embodiment having the above-described configuration, the printing can be performed when the digital camera 101 is in the photographing mode after setting the number of prints of the captured image that are actually desired. More specifically, in the present exemplary embodiment, with respect to the image data in which the total seven persons, namely, the persons A through G, are captured, the system control circuit 209 of the digital camera 101 transmits the image data to the digital camera 102 and the digital camera 104 with respect to the person A, the person B, and the person F. On the other hand four copies of the image data are printed with respect to the other persons, namely, the person C, the person D, the person E, and the person G.

With the above-described configuration, the present exemplary embodiment can readily set the appropriate number of prints and only necessary print processing is performed. Accordingly, the present exemplary embodiment can suppress or reduce the waste of paper.

Furthermore, the exemplary embodiment of the present invention suspends the processing for setting the number of prints when a photographing request has been issued by the operator, in particular when the operator suddenly starts a photographing operation in a photographing mode. In such a case, after the instructed photographing operation ends, the present exemplary embodiment resumes the suspended processing for setting the number of prints. Accordingly, the present invention can perform the processing for setting the number of prints without causing the operator to wait for a long time until the desired photographing operation starts.

A second exemplary embodiment of the present invention is described below. In the second exemplary embodiment, the digital camera 101 performs an image reproduction operation in an image reproduction mode. Further, the digital camera 101 sets the number of prints for an arbitrary reproduced image and issues a print instruction to the printer 107. If the image reproduced at this time includes the person who corresponds to the face data registered in the digital cameras 102 through 106, then the digital camera 101 transmits the image data to the corresponding digital camera.

Then, the digital camera 101 issues an instruction for printing the image data as many as the number of prints. The number of prints is calculated by subtracting the number of the registered face data corresponding to the digital cameras 102 through 106, to which the image data has been successfully transmitted, from the total number of persons captured in the image.

Further, the present exemplary embodiment can change of the number of prints that has been set. More specifically, the digital camera 101 can receive a request for performing the printing of an additional copy (hereinafter simply referred to as an "additional copy print request") request from the digital cameras 102 through 106. When the owner of the digital cameras 102 through 106 issues an additional copy print request, the system control circuit 209 can increase (change) the number of prints by adding the number of requested additional copies. Furthermore, the present exemplary embodiment can change the number of prints that is currently set, before the operator of the digital camera 101 issues a print request.

Figure 14:
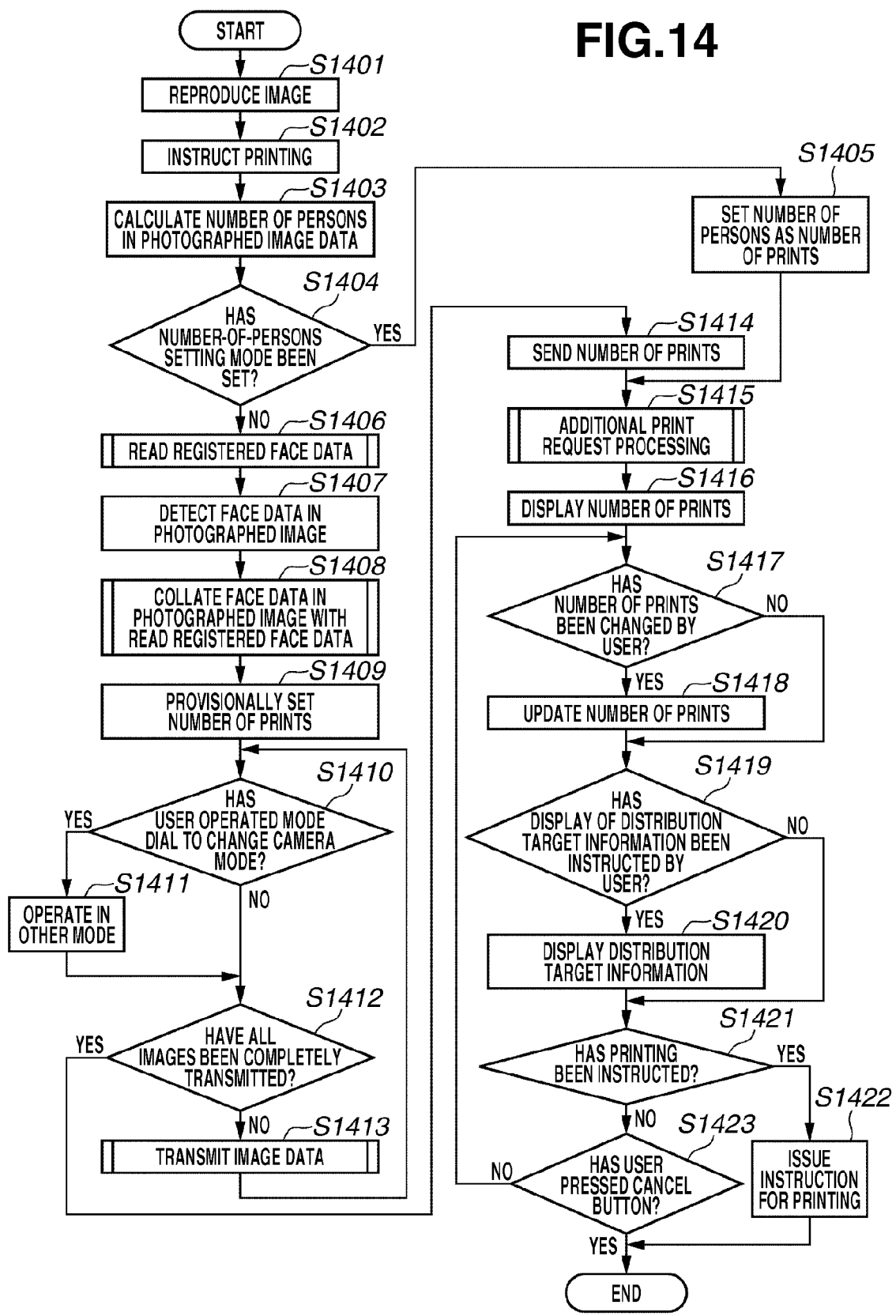
FIG. 14 is a flow chart that illustrates an example of processing for setting the number of prints in a second exemplary embodiment of the present invention.
Figure 15:
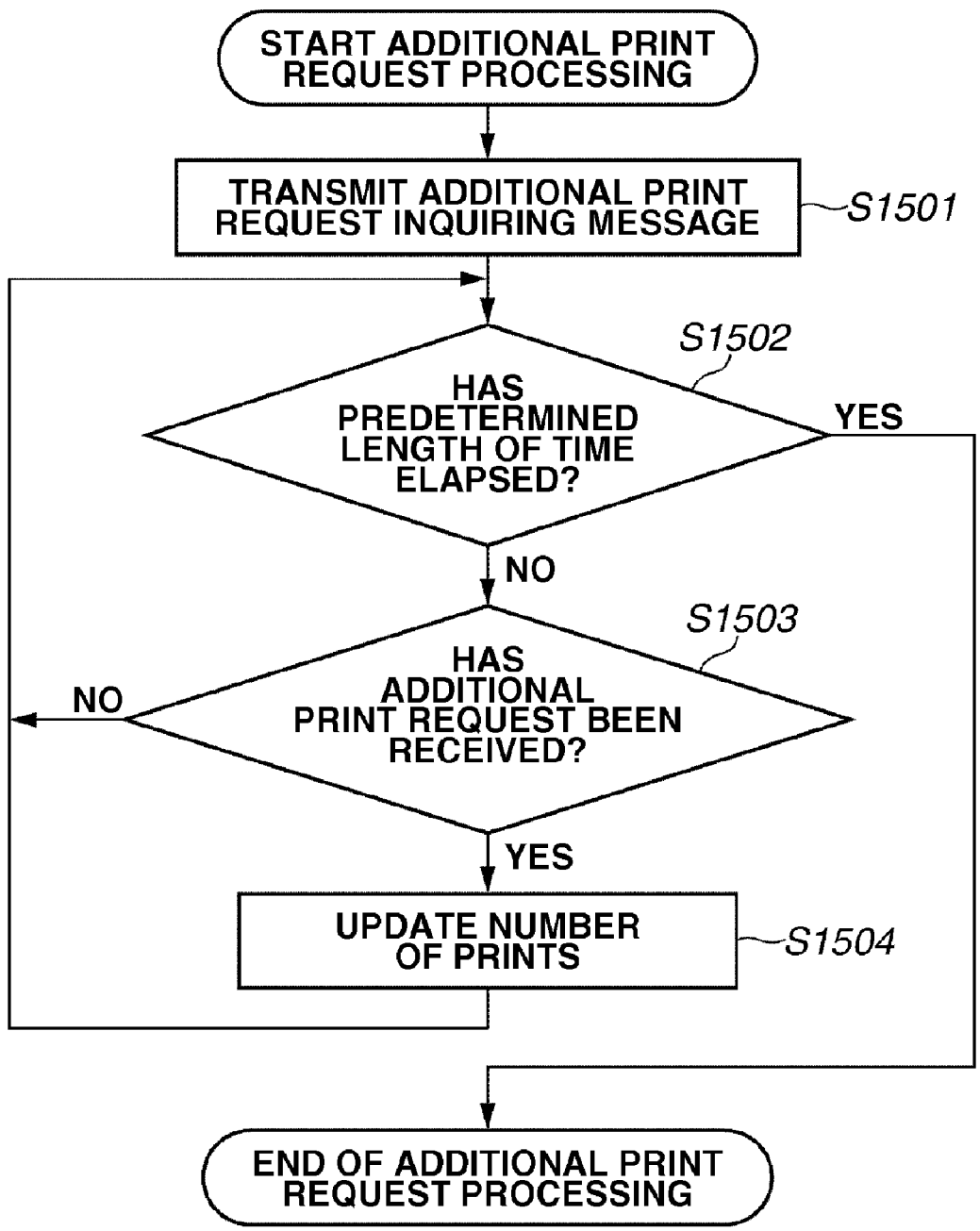
FIG. 15 is a flow chart that illustrates an example of additional copy print requesting processing according to the second exemplary embodiment of the present invention.

FIGS. 14 and 15 are flow charts that illustrate an example of processing for setting the number of prints according to the second exemplary embodiment. The digital cameras 101 through 106, the printer 107, the layout of persons in an image, and the state of each digital camera 101 through 106 are similar to those in the first exemplary embodiment illustrated in FIG. 3. When the operator powers on the digital camera 101 and operates the mode dial of the operation unit 223 to set the digital camera 101 to the reproduction mode, the digital camera 101 performs the following processing as illustrated in a flow chart of FIG. 14.

Referring to FIG. 14, in step S1401, when the operator operates a switch of the operation unit 223 to perform, for example, an image advancing operation to select an arbitrary image data to be reproduced, the system control circuit 209 reproduces the selected image data.

In step S1402, the system control circuit 209 receives a print instruction. When the operator issues an instruction for performing printing by selecting a print instruction from a menu displayed on the display unit 221 or presses a button for issuing a print instruction among the buttons of the operation unit 223, the system control circuit 209 issues an instruction for printing the reproduced image.

The processing in step S1403 through step S1409 is similar to that in step S404 through step S410 (FIG. 4) in the first exemplary embodiment. Accordingly, the description thereof will not be repeated here.

In step S1405, the system control circuit 209 sets the number of persons captured in the image as the number of prints. Then, the processing advances to step S1415. This is a difference between the second exemplary embodiment and the first exemplary embodiment.

Information about the registered apparatuses used in processing for reading the registered face data in step S1406 is similar to that illustrated in FIG. 6 in the first exemplary embodiment.

FIG. 3 illustrates the digital cameras 101 through 106, the printer 107, the layout of persons in an image, and the state of each digital camera according to the present exemplary embodiment. In step S1409, the system control circuit 209 provisionally sets the number of prints. It is assumed that the system control circuit 209 sets a parameter value "7 copies" as the provisionally set number of prints set in step S1409, similar to the processing in step S410 (FIG. 4) in the first exemplary embodiment.

In step S1410, the system control circuit 209 determines whether the mode dial of the operation unit 223 has been operated by the operator to change the operation mode of the digital camera 101. If it is determined in step S1410 that the mode dial of the operation unit 223 has not been operated by the operator (NO in step S1410), then the processing advances to step S1412.

When the operator suddenly starts an image photographing operation, the operation mode is changed by the operator to the photographing mode by operating the mode dial. If it is determined in step S1410 that the mode dial of the operation unit 223 has been operated by the operator to change the operation mode of the digital camera 101 (YES in step S1410), then the processing advances to step S1411.

In step S1411, the system control circuit 209 performs an operation in the mode changed by the operator. More specifically, if the digital camera 101 is set to the photographing mode by the operator, the system control circuit 209 performs the photographing operation. After having completed the above-described operation and detected that the mode dial has been operated by the operator again to return to the reproduction mode, the processing advances to step S1412.

The processing in step S1412 through step S1414 is similar to that performed in step S414 through step S416 (FIG. 4) in the first exemplary embodiment. Accordingly, the description thereof will not be repeated here.

In step S1414, the system control circuit 209 sets a setting value for the final number of prints. In the present exemplary embodiment, the system control circuit 209 sets a parameter value to "4 copies" in the same manner as in step S416 in the first exemplary embodiment. In step S1415, the system control circuit 209 performs additional copy print requesting processing.

FIG. 15 is a flow chart that illustrates an example of additional copy print requesting processing in step S1415 of FIG. 14 according to the present exemplary embodiment. Referring to FIG. 15, in step S1501, the digital camera 101 sends an additional copy print request inquiry to the digital camera 102, 104, and 105 which can communicate with the digital cameras 101. Then, the processing advances to step S1502.

In this case, it is also useful to transmit thumbnail data of the image to be printed at the same time to inform the digital camera 102, 104, and 105 of the image data which is to be further printed as an additional copy according to the additional copy print request.

In step S1502, the system control circuit 209 determines whether a predetermined length of time has elapsed since the additional copy print request inquiry is transmitted in step S1501.

If it is determined in step S1502 that the predetermined length of time has elapsed since the additional copy print request inquiry is transmitted in step S1501 (YES in step S1502), then the system control circuit 209 recognizes that no further reply to the additional copy print request inquiry will be issued. Then, the system control circuit 209 ends the additional copy print requesting processing.

With respect to the time set as the predetermined length of time, the time at which the additional copy print request may be received is set. It is necessary to previously set the time between the digital camera 101 and each of the digital cameras 102 through 106.

It is necessary that each of the digital cameras 102 through 106 recognizes by what time the additional copy print request is to be sent after the reception of the additional copy print request inquiry sent from the digital camera 101 in step S1501.

The predetermined length of time is not limited to a specific length of time. However, it is useful if "thirty seconds" or "sixty seconds" is set as the predetermined length of time considering a length of time which is enough for each operator to determine whether to issue an additional copy print request and issue the request if necessary after the digital camera 102, the digital camera 104, and the digital camera 105 receive the additional copy print request inquiry.

On the other hand, if it is determined in step S1502 that the predetermined length of time has not elapsed yet since the additional copy inquiry is transmitted in step S1501 (NO in step S1502), then the processing advances to step S1503.

In step S1503, the system control circuit 209 determines whether an additional copy print request has been received from the digital cameras 102 through 106.

If it is determined in step S1503 that an additional copy print request has been received from the digital cameras 102 through 106 (YES in step S1503), then the processing advances to step S1504. On the other hand, if it is determined in step S1503 that no additional copy print request has been received (NO in step S1503), then the processing returns to step S1502.

In the present exemplary embodiment, the person I, who is the owner of the digital camera 104, is assumed to operate the digital camera 104 to issue a request for printing additional three copies.

Figure 16:
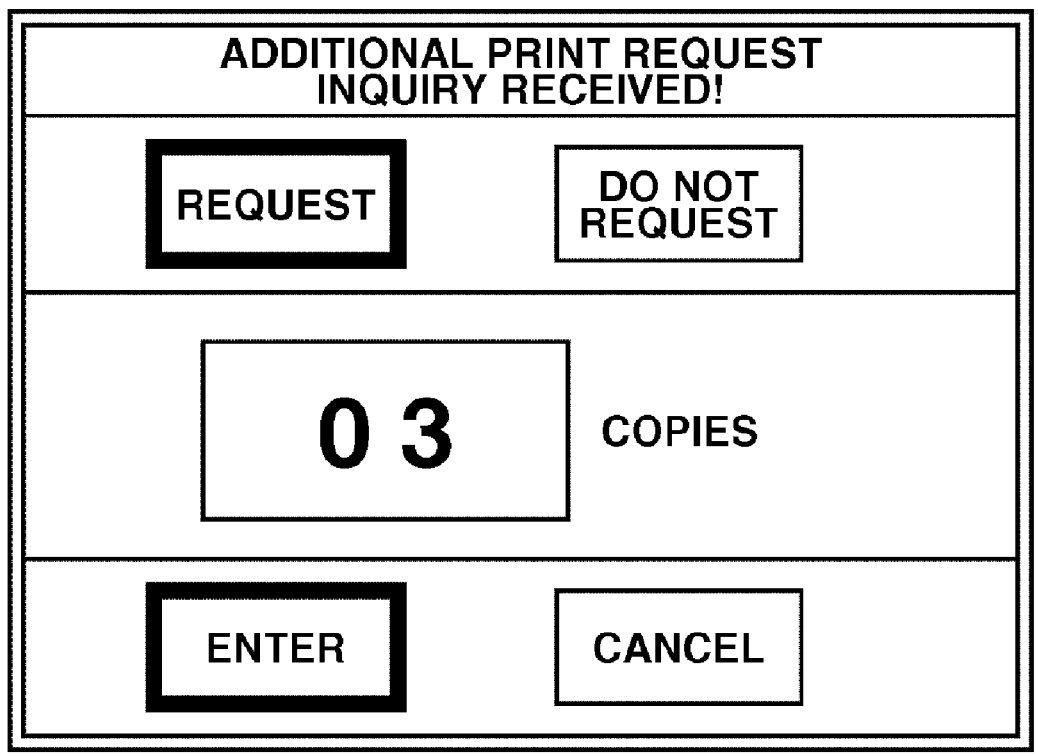
FIG. 16 illustrates an example of an additional copy print requesting screen according to the exemplary embodiment of the present invention.

In response to the additional copy print request inquiry sent from the digital camera 101 in step S1501, the system control circuit 209 displays an additional copy print request screen illustrated in FIG. 16 on a display unit of the digital camera 104.

The person I operates a button via a screen of the display unit of the digital camera 104 to issue an additional copy print request for three copies as illustrated in FIG. 16. Then, the digital camera 104 sends the additional copy print request to the digital camera 101 together with information indicating that the number of additional prints is "3 copies".

Here, the other digital cameras, namely, the digital camera 102 and the digital camera 105, do not issue an additional copy print request. Accordingly, in step S1503, the digital camera 101 receives the additional copy print request for printing three copies from the digital camera 104. Then, the processing advances to step S1504.

In step S1504, the system control circuit 209 updates the number of prints. The current number of prints that has been set in step S1414 is "4 copies". The system control circuit 209 adds the number of copies requested in step S1503 to the currently set number of prints. Thus, the number of prints is updated.

In step S1503, the digital camera 101 receives the additional copy print request for three copies from the digital camera 104. Accordingly, the system control circuit 209 updates the number of prints to "7 copies" by adding "3" to the parameter value "4 copies", which is the current number of prints. The system control circuit 209 stores the updated number of prints in the memory 220. Then, the processing advances to step S1502.

In step S1502, the system control circuit 209 determines again whether the predetermined length of time has elapsed. If it is determined in step S1502 that the predetermined length of time has not elapsed (NO in step S1502), then the system control circuit 209 repeats the processing in step S1503 and step S1504.

In the present exemplary embodiment, no other apparatus than the digital cameras 104 sends an additional copy print request to the digital camera 101. Accordingly, if it is determined in step S1502 that the predetermined length of time such as thirty seconds or sixty seconds has elapsed (YES in step S1502), then the system control circuit 209 ends the additional copy print requesting processing.

Returning to FIG. 14, in step S1416, the system control circuit 209 displays the number of prints on the display unit 221.

Further, the system control circuit 209 reads the setting value for the number of prints stored on the memory 220. Then, the system control circuit 209 displays the read setting value on the display unit 221 as the number of prints.

Figure 17:
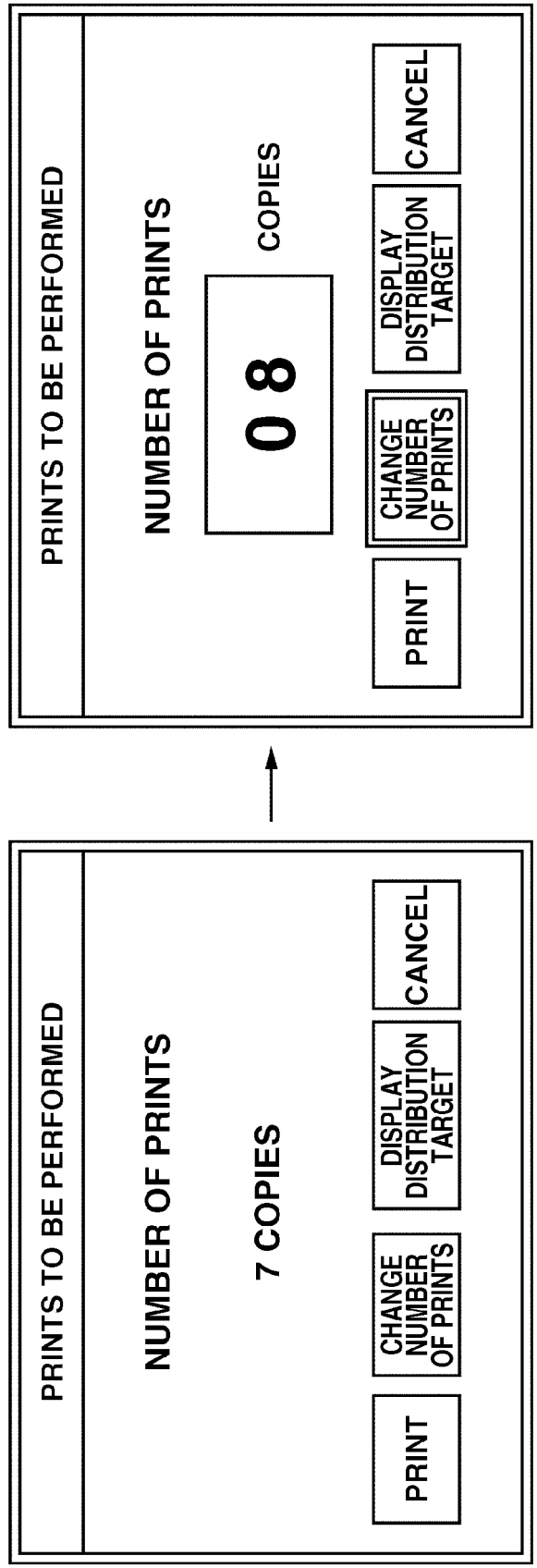
FIG. 17 illustrates an example of a screen for displaying the number of prints according to the exemplary embodiment of the present invention.

FIG. 17 illustrates an example of a screen for displaying the number of prints according to the present exemplary embodiment. As illustrated in FIG. 17, the operator can select whether to print the copies of the image data as many as the displayed number of prints, whether to change the number of prints, or whether to display the transmission target person.

In step S1417, the system control circuit 209 determines whether the operator has selected and issued an instruction for changing the number of prints on the display in step S1416.

If it is determined in step S1417 that the operator has not selected and issued an instruction for changing the number of prints (NO in step S1417), then the processing advances to step S1419. On the other hand, if it is determined in step S1417 that the operator has selected and issued an instruction for changing the number of prints (YES in step S1417), then the processing advances to step S1418.

In the present exemplary embodiment, it is supposed that the operator of the digital camera 101 has issued an instruction for printing additional one copy of the image data with the printer 107 to keep one copy of the image data himself. More specifically, as illustrated in FIG. 17, the operator has operated the button displayed on the display unit 221 to select and change the number of prints from the current number of prints that has been set to "7 copies". Then, the processing advances to step S1418.

In step S1418, the system control circuit 209 updates the number of prints. As illustrated in FIG. 17, the operator operates, for example, an "upward" button and a "downward" button (not illustrated) to increase the number of prints by 1 to 8 copies. Then, the system control circuit 209 stores the updated number of prints on the memory 220. Then, the processing advances to step S1419.

In step S1419, the system control circuit 209 determines whether the operator has selected and issued an instruction for displaying transmission target information.

If it is determined in step S1419 that the operator has not selected and issued the instruction (NO in step S1419), then the processing advances to step S1421. On the other hand, if it is determined in step S1419 that that the operator has selected and issued the instruction for displaying transmission target information (YES in step S1419), then the processing advances to step S1420.

In step S1420, the system control circuit 209 displays face information about the transmission target on the display unit 221. In the present exemplary embodiment, as illustrated in FIG. 18, the system control circuit 209 displays the face of the transmission target person.

The person for whom the parameter "FALSE" has been set to the image transmission completion flag illustrated in FIG. 12 is the transmission target of the print product, as in step S418 in the first exemplary embodiment. In the second exemplary embodiment, the person C, the person D, the person E, and the person G are the transmission targets.

Figure 18:
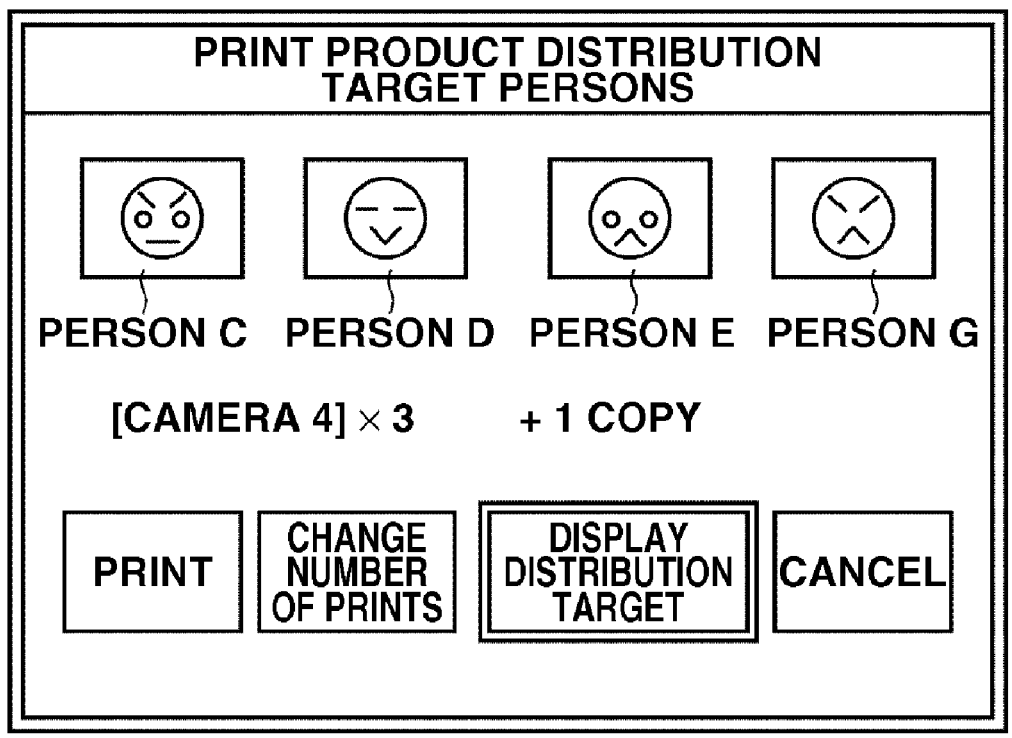
FIG. 18 illustrates an example of a screen that displays information of a person who is a transmission target of a print product according to the exemplary embodiment of the present invention.

Accordingly, as illustrated in FIG. 18, the face data of the person C, the person D, the person E, and the person G in the collation target face data list stored on the memory 220 is displayed on the display unit 221.

In the present exemplary embodiment, it is assumed that in step S1415, the person I has operated the digital camera 104, which is the "camera 4", to issue an instruction for printing additional three copies of the image data. Accordingly, the system control circuit 209 displays information "camera 4×3", which indicates that three print copies are to be handed to the operator of the digital camera 104.

Further, in the present exemplary embodiment, one copy has been added to the number of prints in step S1418 so that the operator of the digital camera 101 himself can possess the print product of the image data. Accordingly, the system control circuit 209 displays information "+1 copy", which corresponds to the additional copy for the operator of the digital camera 101.

With respect to the additional one copy added by the digital camera 101, the number of the additional copy(s) is merely displayed and the transmission target is not displayed because its transmission target person has not been particularly designated at the time of the request thereto. However, it is also useful to add information that indicates the transmission target person at the time of updating the number of prints in step S1418, and to display a face image or the name of the transmission target person in the area.

After having displayed the face image of and the information about the transmission target person, the processing advances to step S1421.

In step S1421, the system control circuit 209 determines whether the operator has selected and issued an instruction for printing the image data. If it is determined in step S1421 that the operator has not selected and issued the instruction (NO in step S1421), then the processing advances to step S1423. On the other hand, if it is determined in step S1421 the operator has selected and issued an instruction for printing the image data (YES in step S1421), then the processing advances to step S1422.

In step S1422, the system control circuit 209 issues an instruction for performing printing. At this time, the digital camera 101 WUSB-connects with the printer 107. The digital camera 101 transmits, to the printer 107, the number of prints "8 copies", which is the setting value for the number of prints stored on the memory 220, the print instruction message, and the image data. Then, the digital camera 101 ends the processing for setting the number of prints.

In step S1423, the system control circuit 209 determines whether the operator has selected and issued an instruction for canceling the printing.

If it is determined in step S1423 that the operator has not selected or issued an instruction for canceling the printing (NO in step S1423), then the processing returns to step S1417. On the other hand, if it is determined in step S1423 that the operator has selected and issued the instruction for canceling the printing (YES in step S1423), then the system control circuit 209 recognizes that the operator has cancelled the printing operation.

Then, the system control circuit 209 ends the processing for setting the number of prints.

After receiving the print start instruction and the image data from the digital camera 101, the printer 107 prints eight copies of the image data. The eight copies of print product are distributed according to the information displayed on the display unit 221 in step S1420.

More specifically, one copy of the print product is distributed to each of the person C, the person D, the person E, and the person G, while three copies of the print product are distributed to the person I, who is the operator of the "camera 4" and has issued the additional copy print request. The operator of the digital camera 101 can keep the other one copy of the print product that has been printed to be possessed by himself.

If the operator desires to re-verify the transmission target person after having performed the printing in step S1421, the processing may advance to step S1420 in the flow chart of FIG. 14 to display the information about the transmission target person again to allow the operator to verify the transmission target person.

As described above, the present exemplary embodiment can set the number of prints actually desired and necessary with respect to the reproduced image and perform the printing when the digital camera 101 is in the reproduction mode. Thus, with the above-described configuration, the present exemplary embodiment can readily set the appropriate number of prints and perform only the actually desired and necessary print processing. Accordingly, the present exemplary embodiment can suppress or reduce the waste of paper.

Furthermore, the present exemplary embodiment can receive additional copy print request in printing the currently reproduced image. Accordingly, even if the registered face data is not included in the image data and if the operator of the digital camera desires to possess an additional print copy of the image data, the present exemplary embodiment can add the number of additional print copies to the currently set number of prints.

Moreover, the present exemplary embodiment can adjust or change the number of prints before the instruction for printing the image data is issued. Accordingly, the present exemplary embodiment can add the number of prints so that the operator of the digital camera 101 himself can possess one or more print product of the image data.

Furthermore, if the number of remaining print papers becomes small, the present exemplary embodiment can once make an adjustment by reducing a number of prints and preferentially print another image.

A third exemplary embodiment of the present invention is described below. In the third exemplary embodiment, while the digital camera 101 performs a photographing operation in the photographing mode, the system control circuit 209 performs only the setting of the number of prints for the captured image and does not transmit the image data or issue a print instruction.

The reason for performing the above operation is that when the image data transmission processing or the print processing according to the user (operator) instruction is performed, a load on a central processing unit (CPU) of the digital camera 101 may be increased or a great amount of memory resource may be used therefor, which may affect a continuous photographing operation.

A difference from the first exemplary embodiment with respect to the setting of the number of prints is that in the present exemplary embodiment, the result of transmitting the image data to the digital cameras 102 through 106 is not reflected on the number of prints. More specifically, if the person who corresponds to the face data registered in the digital cameras 102 through 106 is included in the captured image, the system control circuit 209 calculates the number of prints by subtracting the number of the person who corresponds to the registered face data from the total number of persons captured in the image and stores the calculated number of prints together with the image data transmission target.

Figure 19:
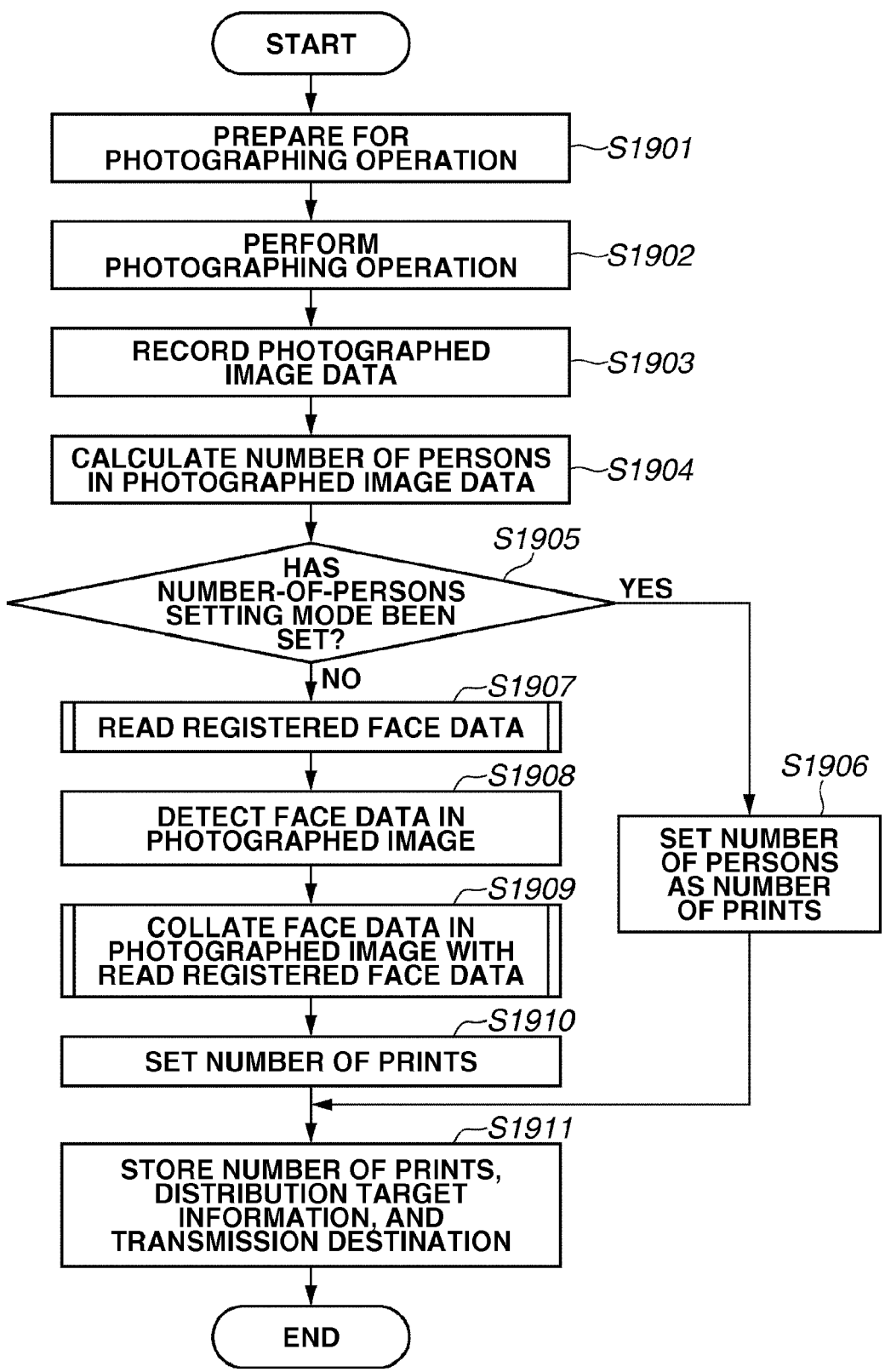
FIG. 19 is a flow chart that illustrates an example of processing for setting the number of prints according to a third exemplary embodiment of the present invention.

FIG. 19 is a flow chart that illustrates an example of processing for setting the number of prints according to the third exemplary embodiment of the present invention. The digital cameras 101 through 106, the printer 107, the layout of persons in the image, and the state of each digital camera 101 through 106 according to the present exemplary embodiment are similar to those in the first exemplary embodiment illustrated in FIG. 3.

When the operator powers on the digital camera 101 and operates the mode dial of the operation unit 223 to set the digital camera 101 in the photographing mode, the digital camera 101 performs the following processing as illustrated in a flow chart of FIG. 14.

The processing in step S1901 through step S1909 is similar to that in step S401 through step S409 (FIG. 4) in the first exemplary embodiment. Accordingly, the description thereof will not be repeated here. Information about the registered apparatuses used in processing for reading the registered face data in step S1907 is the same as that illustrated in FIG. 6 in the first exemplary embodiment.

In step S1910, the system control circuit 209 sets the number of prints. In the present exemplary embodiment, the system control circuit 209 subtracts the number of the face data whose matching flag in the collation target face data list (FIG. 8) set in step S905 (FIG. 9) has been set to "TRUE", from the number of persons captured in the image which is counted in step S1904. The system control circuit 209 sets a number calculated by the subtraction as the number of prints.

In the present exemplary embodiment, the digital cameras 101 through 106, the printer 107 and the layout of persons in the image, and the state of each digital camera are similar to the ones as illustrated in FIG. 3. Similarly to the first exemplary embodiment, the number of persons captured in the image stored on the memory 220 in step S1904 is "7".

The matching flag in the collation target face data list (FIG. 8) for the persons A, B, and F is set in step S905 as illustrated in FIG. 12. In the example illustrated in FIG. 12, the number of the face data for which the matching flag is set to "TRUE" is three. In other words, the number of prints set in step S1910 is 7−3=4 (copies).

In step S1911, the system control circuit 209 stores the number of prints, the transmission target information, and the image data transmission target with respect to the captured image. Here, the number of prints is "4 copies" as set in step S1910.

In the present exemplary embodiment, the person C, the person D, the person E, and the person G are the transmission target persons for whom the parameter "FALSE" has been set to the matching flag in the collation target face data list illustrated in FIG. 12. The system control circuit 209 reads the face data of the four persons from the collation target face data list stored on the memory 220.

The image data transmission target is the registered apparatus for which the parameter "TRUE" is set to the transmission target flag in the information about the registered apparatuses in FIG. 6.

The transmission target flag set in step S906 according to the present exemplary embodiment is similar to the transmission target flag in the first exemplary embodiment. With respect to the "camera 2" and the "camera 4", the parameter "TRUE" is set to the image data transmission target flag. In other words, the transmission target of the image data is the "camera 2" and the "camera 4".

Figure 20:
FIG. 20 illustrates an example of a list of the number of prints, transmission target information, and an image data transmission target with respect to an image file according to the exemplary embodiment of the present invention.

The system control circuit 209 associates the number of prints, the transmission target information, and the transmission target of the image data with the file name of the image data. Further, the system control circuit 209 stores the number of prints, the transmission target information, and the transmission target of the image data associated with the file name of the image data in a storage area for storing each of them provided on the memory 220. For example, FIG. 20 illustrates an example of a list of the number of prints, the transmission target information, and the image data transmission target in the case where the file name of the photographed image data is "001.JPG" according to the present exemplary embodiment. Then, the system control circuit 209 ends the processing for setting the number of prints.

When the number of prints and the image data transmission target are set for the image data acquired by each photographing operation, the system control circuit 209 sequentially adds the image data to the list illustrated in FIG. 20 in step S1911. Although a detailed description will not be made here, the print processing, image data transmission processing, and the distribution of the print product are performed with respect to all image data in a lump according to the information stored in the list illustrated in FIG. 20 after the operation in the photographing mode is completed.

As described above, the present exemplary embodiment can set the actually desired and necessary number of prints with respect to the captured image. Further, in performing the printing of the captured image in a lump after the photographing operation in the photographing mode is completed, the present exemplary embodiment performs the necessary print processing only. Thus, the present exemplary embodiment can prevent the waste of paper.

Furthermore, the present exemplary embodiment only stores the actually desired and necessary number of prints with respect to the captured image data and the transmission target of the image data. More specifically, the present exemplary embodiment neither transmits the image data to the digital cameras 102 through 106, nor issues a print instruction nor transmits the image data to the printer 107.

Accordingly, the present exemplary embodiment can allocate the capacity of the CPU and the memory resource to the photographing operation. As a consequence, the present exemplary embodiment can perform the photographing operation without interruption.

A fourth exemplary embodiment of the present invention is described below. In the fourth exemplary embodiment, the system control circuit 209 sets the number of prints by using a Digital Print Order Format (DPOF) file.

The digital camera 101 reproduces an image in the reproduction mode.

Further, the operator sets the number of prints for an arbitrary reproduced image. Then, the system control circuit 209 records the number of prints set in the DPOF file.

The system control circuit 209 stores the number of persons captured in the reproduced image in the DPOF file as the number of prints. If the reproduced image includes the person who corresponds to the face data registered in the digital cameras 102 through 106, then the system control circuit 209 transmits the image data to the corresponding digital camera. Furthermore, the system control circuit 209 updates the DPOF file every time the image is successfully transmitted.

Each of FIGS. 21 and 22 is a flow chart that illustrates an example of processing for setting the number of prints according to the fourth exemplary embodiment of the present invention. The digital cameras 101 through 106, the printer 107, the layout of persons in an image, and the state of each digital camera according to the present exemplary embodiment are similar to the ones as illustrated in FIG. 3 in the first exemplary embodiment.

When the operator powers on the digital camera 101 and operates the mode dial of the operation unit 223 to set the digital camera 101 in the reproduction mode, the digital camera 101 performs the following processing as illustrated in a flow chart of FIG. 21.

Referring to FIG. 21, in step S2101, when the operator operates a switch of the operation unit 223 to perform an image advancing operation to select an arbitrary image data to be reproduced, the system control circuit 209 reproduces the selected image data.

In step S2102, the system control circuit 209 receives an instruction for setting the number of prints. When the operator issues an instruction for setting the number of prints by selecting the instruction from a menu displayed on the display unit 221 or presses a button for issuing an instruction for setting the number of prints among the buttons of the operation unit 223, the system control circuit 209 issues an instruction for setting the number of prints as to the reproduced image.

In step S2103, the system control circuit 209 counts the number of persons captured in the image as performed in step S404 in the first exemplary embodiment. The system control circuit 209 stores a result of the counting on the memory 220. The digital cameras 101 through 106, the printer 107, the layout of persons in an image, and the state of each digital camera are as illustrated in FIG. 3. The number of persons captured in the image stored on the memory 220 in step S2103 is "7".

In step S2104, the system control circuit 209 records the number of persons captured in the reproduced image which is counted in step S2103 in the DPOF file as the number of prints. The number of persons acquired by counting in step S2103 is "7". Accordingly, the system control circuit 209 records the parameter value "7 copies", which is the number of prints for the reproduced image, in the DPOF file.

If no DPOF file for setting the number of prints does not exist in the flash memory 212 of the digital camera 101 at the time of performing processing in step S2104, then the system control circuit 209 newly generates a DPOF file for setting the number of prints. Then, the system control circuit 209 records the parameter value "7 copies", which is the number of prints for the reproduced image, in the DPOF file.

On the other hand, if a DPOF file for setting the number of prints exists in the flash memory 212 of the digital camera 101, then the system control circuit 209 overwrites the existing DPOF file records with the number of prints for the reproduced image by adding information about the number of prints as to the reproduced image to the existing DPOF file.

In step S2105, the system control circuit 209 determines whether the "number-of-persons setting mode" or the "number-of-prints automatic setting mode" has been set as the mode for setting the number of prints. Here, it is assumed that the operator has previously set either mode via the menu screen. If it is determined in step S2105 that the "number-of-persons setting mode" has been set as the mode for setting the number of prints, then the processing advances to step S2113. On the other hand, if it is determined in step S2105 that the "number-of-prints automatic setting mode" has been set as the mode for setting the number of prints, then the processing advances to step S2106.

The processing in step S2106 through step S2108 is similar to that in step S407 through step S409 (FIG. 4) in the first exemplary embodiment. Accordingly, the description thereof will not be repeated here.

The information about the registered apparatuses used in the processing for reading the registered face data in step S2106 is similar to that illustrated in FIG. 6 in the first exemplary embodiment.

The state of the image transmission target flag when the processing in step S2108 is completed is illustrated in FIG. 10. More specifically, the parameter "TRUE" is set to the image transmission target flag for the "camera 2" and the "camera 4" similar to the first exemplary embodiment. Accordingly, the "camera 2" and the "camera 4" are the image data transmission targets, similarly to the first exemplary embodiment.

In step S2109, the system control circuit 209 determines whether the mode dial of the operation unit 223 has been operated by the operator to change the operation mode of the digital camera 101.

If it is determined in step S2109 that the mode dial of the operation unit 223 has not been operated by the operator to change the operation mode of the digital camera 101 (NO in step S2109), then the processing advances to step S2111. When the operator suddenly starts an image photographing operation, the operation mode is changed by the operator to the photographing mode by operating the mode dial. Accordingly, if the operation mode is changed, the processing advances to step S2110.

In step S2110, the system control circuit 209 performs an operation according to the changed mode. In this regard, for example, the system control circuit 209 performs the photographing operation if the operation mode of the digital camera 101 has been changed by the operator to the photographing mode. After having completed the operation, the system control circuit 209 detects that the mode dial has been returned to the reproduction mode. Then, the processing advances to step S2111.

In step S2111, the system control circuit 209 determines whether all the image data has been transmitted to the registered apparatuses that are the image data transmission targets.

If it is determined in step S2111 that all the image data has been transmitted (YES in step S2111), then the processing advances to step S2113. On the other hand, if it is determined in step S2111 that all the image data has not been transmitted (NO in step S2111), then the processing advances to step S2112.

At this stage, the system control circuit 209 has not yet performed the image data transmission processing. Accordingly, the processing advances to step S2112. In step S2112, the system control circuit 209 transmits the image data.

FIG. 22 is a flow chart that illustrates an example of image data transmission processing in step S2112 of FIG. 21 according to the present exemplary embodiment.

In the present exemplary embodiment, it is necessary to transmit the image data to the "camera 2" and the "camera 4", for which the parameter "TRUE" has been set to the image transmission target flag (FIG. 10).

The system control circuit 209 transmits the image data in order of the digital camera 102, which is the "camera 2", and the digital camera 104, which is the "camera 4". Accordingly, at first, the system control circuit 209 connects with the digital camera 102, which is the "camera 2".

The processing in step S2201 through step S2205 of FIG. 22 is similar to that in step S1101 through step S1105 in the first exemplary embodiment. Accordingly, the description thereof will not be repeated here.

When the image data is successfully transmitted to the digital camera 102, which is the "camera 2" (YES in step 2204), the system control circuit 209 sets the parameter "TRUE" to the image transmission completion flag for the persons A and B (FIG. 8) in step S2205, as in the first exemplary embodiment. Then, the processing advances to step S2206.

In step S2206, the system control circuit 209 updates the number of prints as to the reproduced image recorded in the DPOF file and overwrites the DPOF file with the updated number of prints. With respect to the updating of the number of prints as to the reproduced image, the system control circuit 209 sets the number of the face data for which the image transmission completion flag has been set to "FALSE" in the collation target face data list illustrated in FIG. 8, as the number of prints for the reproduced image.

After transmitting the image data to the digital camera 102, the processing advances to step S2205. In step S2205, the system control circuit 209 sets the parameter "TRUE" to the image transmission completion flag for the person A and the person B (FIG. 8). Accordingly, the number of the face data for which the parameter "FALSE" has been set to the image transmission completion flag decreases from seven copies to five copies.

Accordingly, in this case, the system control circuit 209 updates the number of prints, "7 copies", recorded in the DPOF file with the value, "5 copies" (overwrites the DPOF file with the updated value). Then, the system control circuit 209 ends the image data transmission processing. Then, the processing advances to step S2109 of FIG. 21.

Returning to FIG. 21, in step S2109, the system control circuit 209 determines whether the mode dial of the operation unit 223 has been operated by the operator to change the operation mode of the digital camera 101. If it is determined in step S2109 that the operation mode of the digital camera 101 is not changed (NO in step S2109), then the processing advances to step S2111.

At this stage, the system control circuit 209 has not yet transmitted all the images to the registered apparatus, which is the image data transmission target. Accordingly, the processing advances to step S2112.

FIG. 22 is a flow chart that illustrates an example of image data transmission processing in step S2112 of FIG. 21 according to the present exemplary embodiment. Referring to FIG. 22, in step S2201, the system control circuit 209 transmits the image to the digital camera 104, which is the "camera 4". Then, the processing advances to step S2202. In step S2202, the system control circuit 209 determines whether the communication has been successfully established. If it is determined in step S2202 that the communication has been successfully established (YES in step S2202), then the processing advances to step S2203.

In step S2203, the system control circuit 209 transmits the image data to the digital camera 104, which is the "camera 4". If the image data is successfully transmitted to the digital camera 104, which is the "camera 4", the processing advances to step S2205. In step S2205, the system control circuit 209 newly sets the parameter "TRUE" to the image transmission completion flag for the person F (FIG. 8) as in the first exemplary embodiment. Then, the processing advances to step S2206.

In step S2206, the system control circuit 209 updates the number of prints for the reproduced image and overwrites the DPOF file with the updated number of prints for the reproduced image. After having transmitted the image data to the digital camera 104, the system control circuit 209, in step S2205, newly sets the image transmission completion flag for the person F (FIG. 8).

After performing the above-described processing, the number of the face data for which the parameter "FALSE" has been set to the image transmission completion flag decreases from five copies to four copies as illustrated in FIG. 12 as in the first exemplary embodiment.

Accordingly, the system control circuit 209 updates the number of prints "5 copies" recorded in the DPOF file to "4 copies" and records the updated number of prints the DPOF file by overwriting the DPOF file with the updated number of prints.

Then, the system control circuit 209 ends the image data transmission processing and the processing advances to step S2109 of FIG. 21.

Returning to FIG. 21, in step S2109, the system control circuit 209 determines whether the mode dial of the operation unit 223 has been operated by the operator to change the operation mode of the digital camera 101. If it is determined in step S2109 that the operation mode of the digital camera 101 is not changed (NO in step S2109), then the processing advances to step S2111.

At this stage, the system control circuit 209 has transmitted all the images to the registered apparatus, which is the image data transmission target. Accordingly, the processing advances to step S2113.

In step S2113, the system control circuit 209 displays information about the person who is the transmission target of the print product on the display unit 221. In the present exemplary embodiment, the person C, the person D, the person E, and the person G are the transmission targets as in the first exemplary embodiment.

Accordingly, the system control circuit 209 displays, on the display unit 221, the face data of the person C, the person D, the person E, and the person G, which is held in the collation target face data list stored on the memory 220 as illustrated in FIG. 13.

In step S2114, the system control circuit 209 determines whether the operator has pressed the exit button via the screen illustrated in FIG. 13. If it is determined in step S2114 that the operator has not pressed the exit button (NO in step S2114), then the processing repeats the processing in step S2114.

In step S2114, the system control circuit 209 determines again whether the operator has pressed the exit button. If it is determined in step S2114 that the operator has pressed the exit button (YES in step S2114), then the system control circuit 209 ends the processing for setting the number of prints.

Here, the number of prints for the reproduced image recorded in the DPOF file which is stored on the flash memory 212 of the digital camera 101 is "4 copies" at the time the processing for setting the number of prints is completed.

When the operator brings a memory card storing (recording) the DPOF file to a photo studio and prints the desired image data stored in the DPOF file, four copies of the image are printed.

The print products of four copies are distributed to the person C, the person D, the person E, and the person G according to the display of the transmission target persons performed in step S2113.

If the operator desires to re-verify the transmission target persons after the printing at the photo studio, the system control circuit 209 performs the processing in the flow chart of FIG. 21 up to the processing in step S2113 to display information about the transmission target persons again. Thus, in this case, the operator can verify the transmission target persons again.

As described above, the system control circuit 209 can set the number of prints for the reproduced image and record the set number of prints for the reproduced image in the DPOF file.

More specifically, the present exemplary embodiment transmits the image data including the seven persons A through G, to the digital camera 102 and the digital camera 104 for the person A, the person B, and the person F. With respect to the other four persons, namely, the person C, the person D, the person E, and the person G, the system control circuit 209 can record the value "4 copies" in the DPOF file as the number of prints.

With the above-described configuration, the present exemplary embodiment can prevent issuing an excessive print order that exceeds the actually necessary number of prints at the time of bringing the memory card or the like recording the desired image data to a photo studio. As described above, the present exemplary embodiment can prevent unnecessary print charges.

Furthermore, the present invention can also be achieved by providing a system or a device with a storage medium (or a recording medium) which stores program code of software implementing the functions of the embodiments and by reading and executing the program code stored in the storage medium with a computer of the system or the device (a CPU or an micro processing unit (MPU)).

In this case, the program code itself, which is read from the storage medium, implements the functions of the embodiments mentioned above, and accordingly, the storage medium storing the program code constitutes the present invention.

As the recording medium for supplying such program code, a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD) (a DVD-read only memory (DVD-ROM) and a DVD-recordable (DVD-R)), for example, can be used.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-319992 filed Dec. 11, 2007, which is hereby incorporated by reference herein in its entirety.

What is claimed is:

1. An image processing apparatus comprising:
a setting unit configured to set a number of prints for image data;
a storage unit configured to store identification information for identifying objects in association with transmission target information used for transmitting the image data to an external apparatus; and
a collation unit configured to collate the objects identified from the image data and the identification information, wherein
the setting unit can set the number of prints for the image data according to a difference between a number of the objects identified from the image data and a number of the transmission target information associated with a number of the identification information that matches the objects identified from the image data as a result of the collation.

2. The image processing apparatus according to claim 1, further comprising a transmission unit configured to transmit the image data according to the transmission target information associated with the person matching the identification information that is associated with the transmission target information as a result of collation by the collation unit.

3. The image processing apparatus according to claim 1, wherein the setting unit sets as the number of prints, a value calculated by subtracting the number of identification information matching the objects identified from the image data as a result of the collation, from the number of the objects identified from the image data.

4. The image processing apparatus according to claim 1, wherein the number of prints set by the setting unit can be changed by an operation of a user.

5. The image processing apparatus according to claim 1, further comprising a display unit configured to display, after performing the setting by the setting unit, information about objects that have not matched the identification information associated with the transmission target information.

6. The image processing apparatus according to claim 1, wherein the number of prints set by the setting unit is recorded in a digital print order format (DPOF) file.

7. The image processing apparatus according to claim 1, further comprising a selection unit configured to select whether to set the number of the objects identified from the image data as the number of prints for the image data, or to set the difference between the number of objects identified from the image data and the number of objects that match the identification information associated with the transmission target information, as the number of prints for the image data.

8. An image processing apparatus comprising:
   a setting unit configured to set a number of prints for image data;
   a storage unit configured to store identification information for identifying objects in association with information about an external apparatus to which the image data is to be transmitted;
   a collation unit configured to collate the objects identified from the image data and the identification information; and
   a transmission unit configured to transmit the image data to the external apparatus according to the information about the external apparatus that is associated with the objects that matches the identification information associated with the transmission target information, as a result of the collation, wherein
   the setting unit sets the number of prints for the image data according to a difference between a number of the objects identified from the image data and a number of the identification information associated with the information about the external apparatus to which the image data is transmitted by the transmission unit.

9. The image processing apparatus according to claim 8, wherein the setting unit sets the number of prints for the image data according to a difference between the number of the objects identified from the image data and the number of the identification information associated with the information about the external apparatus to which the image data has been successfully transmitted by the transmission unit.

10. A method for controlling an image processing apparatus including at least one processor and memory communicatively-coupled via a bus, the method comprising:
    storing, by the memory, identification information for identifying objects in association with transmission target information used for transmitting the image data to an external apparatus;
    collating, by the at least one processor, the objects identified from the image data and the identification information; and
    setting, by the at least one processor, the number of prints for the image data according to a difference between a number of the objects identified from the image data and a number of the transmission target information associated with a number of the identification information that matches the objects identified from the image data as a result of the collation.

11. A non-transitory computer-readable storage medium storing computer-executable instructions, the computer-executable instructions causing a computer to execute the method according to claim 10.

12. A method for controlling an image processing apparatus including at least one processor and memory communicatively-coupled via a bus, the method comprising:
    storing, by the memory, identification information for identifying objects in association with information about an external apparatus to which the image data is to be transmitted;
    collating, by the at least one processor, the objects identified from the image data and the identification information;
    transmitting, by the at least one processor, the image data to the external apparatus according to the information about the external apparatus that is associated with the objects that matches the identification information associated with the transmission target information, as a result of the collation; and
    setting, by the at least one processor, the number of prints for the image data according to a difference between a number of the objects identified from the image data and a number of the identification information associated with the information about the external apparatus to which the image data is transmitted.

13. A non-transitory computer-readable storage medium storing computer-executable instructions, the computer-executable instructions causing a computer to execute the method according to claim 12.

* * * * *